(12) United States Patent
Scholtz

(10) Patent No.: US 11,513,073 B2
(45) Date of Patent: Nov. 29, 2022

(54) APPARATUS AND METHODS FOR SELECTIVE DETECTION OF PATHOGENS AND/OR CHEMICALS

(71) Applicant: James I. Scholtz, New York, NY (US)

(72) Inventor: James I. Scholtz, New York, NY (US)

(*) Notice: Subject to any disclaimer, the term of this patent is extended or adjusted under 35 U.S.C. 154(b) by 77 days.

(21) Appl. No.: 17/224,806

(22) Filed: Apr. 7, 2021

(65) Prior Publication Data

US 2021/0310947 A1 Oct. 7, 2021

Related U.S. Application Data

(60) Provisional application No. 63/006,164, filed on Apr. 7, 2020.

(51) Int. Cl.
*G01N 21/552* (2014.01)
*G01N 21/77* (2006.01)

(52) U.S. Cl.
CPC ....... *G01N 21/553* (2013.01); *G01N 21/7703* (2013.01)

(58) Field of Classification Search
CPC .......................... G01N 21/553; G01N 21/7703
USPC ...................................................... 356/445
See application file for complete search history.

(56) References Cited

U.S. PATENT DOCUMENTS

| 4,505,584 | A | 3/1985 | Kato et al. | |
|---|---|---|---|---|
| 4,817,205 | A | 3/1989 | Asawa | |
| 6,791,690 | B2* | 9/2004 | Corson | G01N 21/6452 |
| | | | | 435/808 |
| 2005/0281508 | A1 | 12/2005 | Krupkin et al. | |
| 2007/0030481 | A1 | 2/2007 | Gilbert | |
| 2009/0079841 | A1 | 3/2009 | Leard et al. | |
| 2009/0103099 | A1* | 4/2009 | Debackere | B82Y 20/00 |
| | | | | 356/244 |
| 2010/0119231 | A1 | 5/2010 | Kim et al. | |
| 2011/0168261 | A1 | 7/2011 | Welser et al. | |
| 2012/0293860 | A1 | 11/2012 | Gundlach et al. | |
| 2015/0340391 | A1 | 11/2015 | Webster | |
| 2018/0106724 | A1* | 4/2018 | Wang | G01R 29/14 |

(Continued)

OTHER PUBLICATIONS

International Search Report issued in PCT Application No. PCT/US19/65300, dated Apr. 20, 2020.

(Continued)

*Primary Examiner* — Sunghee Y Gray
(74) *Attorney, Agent, or Firm* — Hoffmann & Baron, LLP

(57) ABSTRACT

A light transmission structure is provided for use, in conjunction with a light source and detector, for selective detection of biomolecule interactions and/or absorption of infrared light. The light transmission structure includes a substrate having a bottom surface adapted to couple the light source and detector to the light transmission structure, a coupling and enhancing layer disposed on at least a portion of an upper surface of the substrate, a first near-critical angle anti-reflective coating (NCA-ARC) layer disposed on at least a portion of an upper surface of the coupling and enhancing layer, and a second NCA-ARC layer disposed on at least a portion of an upper surface of the first NCA-ARC layer. An upper surface of the second NCA-ARC layer is functionalized and textured so that transmitted incident light is scattered out of the light transmission structure. A difference in refractive index between adjacent NCA-ARC layers is less than about 0.01.

11 Claims, 14 Drawing Sheets

(56) References Cited

U.S. PATENT DOCUMENTS

2018/0128975 A1     5/2018   Tokushima et al.
2020/0404195 A1   12/2020   Scholtz

OTHER PUBLICATIONS

International Search Report issued in PCT Application No. PCT/US21/26225, dated Jul. 9, 2021.

\* cited by examiner

| LAYER # REF. # | MATERIAL TYPE | LAYER THICKNESS NM | REFRACTIVE INDEX N# | REFRACTIVE INDEX N VALUE | INCIDENT ANGLE DEG | LATERAL DISPLACEMENT MM | DESIGN RULES |
|---|---|---|---|---|---|---|---|
| 302 | GLASS SUBSTRATE | 5,000 | N0 | 1.525 | 72.01213 | --- | N0 < N1 > N2 > N3 |
| 304 | SILICON NITRIDE | 102 | N1 | 1.900 | 44.18281 | 0.000198 | N1 > N2 |
| 306 | SILICON DIOXIDE | 3,500 | N2 | 1.461 | 88.31065 | 0.118671 | N2 > N3 |
| 308 | SILICON DIOXIDE | > 0, ≈ 0 | N3 | 1.460 | 89.87687 | --- | N2 ≈ N3 |

| LAYER # REF. # | MATERIAL TYPE | LAYER THICKNESS NM | REFRACTIVE INDEX N# | REFRACTIVE INDEX N VALUE | INCIDENT ANGLE DEG | LATERAL DISPLACEMENT MM | DESIGN RULES |
|---|---|---|---|---|---|---|---|
| 302 | GLASS SUBSTRATE | 5,000 | N0 | 1.525 | 72.01213 | --- | N0 < N1 > N2 > N3 |
| 304 | SILICON NITRIDE | 102 | N1 | 1.98 | 44.18281 | 0.000198 | N1 > N2 |
| 306 | SILICON DIOXIDE | 2,500 | N2 | 1.461 | 88.31065 | 0.084765 | N2 > N3 |
| 308 | SILICON DIOXIDE | 4,200 | N3 | 1.460 | 89.87687 | 1.954381 | N2 ≈ N3 |
| 402 | SILICON DIOXIDE | 550 | N2 | 1.461 | 88.31065 | 0.018648 | N2 > N3 |
| 404 | SILICON DIOXIDE | 100 | N3 | 1.460 | 89.87687 | 0.046532 | N2 ≈ N3 |
| 406 | FUNCTIONALIZED LAYER; PARAMETERS DEPEND ON WHAT THE STRUCTURE IS FUNCTIONALIZED FOR | | | | | | |

*FIG. 4B*

| LAYER # REF. # | MATERIAL TYPE | LAYER THICKNESS NM | REFRACTIVE INDEX N# | REFRACTIVE INDEX N VALUE | INCIDENT ANGLE DEG | LATERAL DISPLACEMENT MM | DESIGN RULES |
|---|---|---|---|---|---|---|---|
| 302 | GLASS SUBSTRATE | 5,000 | N0 | 1.525 | 72.01213 | --- | N0 < N1 > N2 > N3 |
| 304 | SILICON NITRIDE | 102 | N1 | 1.900 | 44.18281 | 0.000198 | N1 > N2 |
| 306 | SILICON DIOXIDE | 2,500 | N2 | 1.461 | 88.31065 | 0.084765 | N2 > N3 |
| 308 | SILICON DIOXIDE | 4,200 | N3 | 1.460 | 89.87687 | 1.954381 | N2 ≈ N3 |
| 402 | SILICON DIOXIDE | 550 | N2 | 1.461 | 88.31065 | 0.018648 | N2 > N3 |
| 404 | SILICON DIOXIDE | 100 | N3 | 1.460 | 89.87687 | 0.046532 | N2 ≈ N3 |
| 502 | SILICON DIOXIDE | 100 | N4 | 1.459 | --- | --- | TIR RESULTS IN 90° PHASE Δ |
| 406 | FUNCTIONALIZED LAYER; PARAMETERS DEPEND ON WHAT THE STRUCTURE IS FUNCTIONALIZED FOR | | | | | | |

APPARATUS AND METHODS FOR SELECTIVE DETECTION OF PATHOGENS AND/OR CHEMICALS

CROSS-REFERENCE TO RELATED APPLICATIONS

This application claims priority to provisional application No. 63/006,164 filed on Apr. 7, 2020, entitled "A Clinical COVID-19 Virus Test with Optical Readout," the disclosure of which is incorporated by reference herein in its entirety for all purposes.

BACKGROUND

The present invention relates generally to infrared imaging, and more particularly to imaging apparatus and methods for selective detection of pathogens and/or chemicals.

The need for rapid, accurate, and non-invasive methods for detecting the presence of select pathogens and/or chemicals continues to drive the development of new testing techniques and procedures. This need for new testing methodologies, particularly as it relates to the diagnosis of disease, has been even more evident during the recent COVID-19 global pandemic.

Diagnostic platforms for detecting either molecular or protein indicators of disease based on electrical, mechanical, or optical transducers are known. For example, electrical sensors based on nanopore arrays have been used to analyze and sequence DNA, mechanical sensor arrays based on cantilevers have been employed to weigh cancers cells, and optical sensors based on plasmonics have been utilized to detect antigen-antibody binding reactions.

Two known optical detection techniques are fluorometric methods and surface plasmon resonance (SPR). Fluorometric methods use various fluorescent dyes as efficient analytical means in optical sensor development. However, photobleaching and fluorescence quenching are common disadvantages of the use of fluorometric dyes. SPR methods are performed using a light source and a thin metallic material. Using SPR, an electromagnetic light wave can be coupled with a surface plasmon wave and change the angle shift of the reflected light as a function of the binding between antibody and pathogen. However, low analytical sensitivity can result, due primarily to the small refractive index, slow diffusion-driven mass transfer, or insufficient depth of the influenced layer, all of which are intrinsic problems of conventional SPR techniques.

Thus, despite the prevalence of optical detection methods, commercialization of virus detection using optical techniques have remained challenging, due at least in part to the complexity and cost of the optical-readout methods, among other factors.

BRIEF SUMMARY

Aspects of the present invention, as manifested in embodiments thereof, provide a beneficial apparatus and method for the selective detection of pathogens and/or chemicals on a surface. One or more embodiments of the invention provide an integrated photonic sensor device including a light source, a detector and a thin-film coating stack supported by a substrate. A top layer of the thin-film coating stack is functionalized for direct detection of select pathogens and/or chemicals for use in numerous applications.

In accordance with one embodiment of the invention, a light transmission structure is provided for use, in conjunction with a light source and detector, for selective detection of biomolecule interactions and/or absorption of infrared light. The light transmission structure includes a substrate having a bottom surface adapted to couple the light source and detector to the light transmission structure, a coupling and enhancing layer disposed on at least a portion of an upper surface of the substrate, a first near-critical angle anti-reflective coating/layer (NCA-ARC) disposed on at least a portion of an upper surface of the coupling and enhancing layer, and a second NCA-ARC layer disposed on at least a portion of an upper surface of the first NCA-ARC layer. An upper surface of the second NCA-ARC layer is functionalized and textured so that transmitted incident light is scattered out of the light transmission structure. A difference in refractive index between adjacent NCA-ARC layers is less than about 0.01, and more preferably less than about 0.001.

In accordance with another embodiment of the invention, a light transmission structure is provided for use, in conjunction with a light source and detector, for selective detection of biomolecule interactions and/or absorption of infrared light. The light transmission structure includes a substrate, the substrate having a bottom surface adapted to couple the light source and detector to the light transmission structure, a coupling and enhancing layer disposed on at least a portion of an upper surface of the substrate, a first NCA-ARC layer disposed on at least a portion of an upper surface of the coupling and enhancing layer, a second NCA-ARC layer disposed on at least a portion of an upper surface of the first NCA-ARC layer, a third NCA-ARC layer disposed on at least a portion of the upper surface of the second NCA-ARC layer, a fourth NCA-ARC layer disposed on at least a portion of an upper surface of the third NCA-ARC layer, and a polarization layer disposed on at least a portion of an upper surface of the fourth NCA-ARC layer. The polarization layer is configured to provide total internal reflection of transmitted light in the light transmission structure. The light transmission structure further includes a surface functionalization layer formed on at least a portion of an upper surface of the polarization layer. The second NCA-ARC layer is formed having a thickness and/or a material type configured to provide a prescribed lateral displacement in the light transmission structure. A difference in refractive index between adjacent NCA-ARC layers is less than about 0.01.

As may be used herein, "facilitating" an action includes performing the action, making the action easier, helping to carry the action out, or causing the action to be performed. Thus, by way of example only and without limitation, for embodiments of the invention that employ multiple processors configured in a distributed manner, instructions executing on one processor might facilitate an action carried out by instructions executing on another processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof may be implemented in the form of a computer program product including a computer readable storage medium with computer usable program code for performing the method steps indicated. Furthermore, one or more embodiments of the invention or elements thereof may be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) may be configured to implement the specific techniques set forth herein.

Various units, circuits, modules, or other components may be described herein as being "configured to" or "adapted to" perform a particular task or tasks. In such contexts, the terms "configured to" or "adapted to" are intended to be construed broadly as a recitation of structure generally meaning "having circuitry or hardware that" performs the particular task or tasks during operation. As such, the unit, circuit, module, or component can be configured or adapted to perform the subject task or tasks even when the unit, circuit, module, or component is not currently powered on or otherwise operating. In general, circuitry or hardware that forms the structure corresponding to "configured to" or "adapted to" may include hardware circuits and/or memory storing program instructions executable to implement the stated operation(s). Similarly, various units, circuits, modules, or components may be described as performing a task or tasks, for convenience in the description. Such descriptions should be interpreted as including the phrase "configured to" or "adapted to." It is to be understood that reciting a unit, circuit, module, or component that is configured or adapted to perform one or more tasks is expressly intended not to invoke a 35 U.S.C. § 112, paragraph (f) interpretation for that unit, circuit, module, or component.

Techniques of the present invention can provide substantial beneficial technical effects. By way of example only and without limitation, one or more embodiments may provide one or more of the following advantages, among other features:

- provides rapid, accurate, and non-invasive detection of the presence of select pathogens and/or chemicals;
- enables automatic alignment of the light source to the top surface of the light transmission structure (i.e., thin-film coating);
- provides spatial and spectral separation which is further enhanced by a lateral displacement achieved by the unique arrangement of layers in the thin-film coating;
- maximizes signal-to-noise ratio by maximizing edge steepness of the response near the critical angle, which permits only light at the correct angle to pass through the thin-film coating;
- provides a compact, integrated design;
- fabrication using wafer-scale processing enables high volume production; and
- ability to use low-cost light sources (e.g., light-emitting diodes) and low-cost detectors (e.g., photodiodes, CMOS cameras, etc.).

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

The following drawings are presented by way of example only and without limitation, wherein like reference numerals (when used) indicate corresponding elements throughout the several views, and wherein:

FIG. 3B is a table depicting exemplary parameters relating to the illustrative light transmission structure shown in FIG. 3A;

FIG. 4B is a table depicting exemplary parameters relating to the illustrative light transmission structure shown in FIG. 4A;

FIG. 5B is a table depicting exemplary parameters relating to the illustrative light transmission structure shown in FIG. 5A;

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of the present invention will be described herein in the context of a sensor apparatus and methods for selective detection of pathogens and/or chemicals, as well as prescribed wavelengths of light (e.g., infrared (IR)). It is to be appreciated, however, that the specific apparatus and/or methods illustratively shown and described herein are to be considered exemplary rather than limiting. Moreover, it will become apparent to those skilled in the art given the teachings herein that numerous modifications can be made to the embodiments shown that are within the scope of the appended claims. That is, no limitations with respect to the embodiments shown and described herein are intended or should be inferred.

As previously stated, despite the prevalence of optical detection methods such as fluorometric methods and surface plasmon resonance (SPR), the commercialization of pathogen and/or chemical detection using optical means has remained challenging, due primarily to the low analytical sensitivity, complexity, and high cost of standard optical-readout methods, among other factors. Furthermore, these conventional methods often require precision optical alignment and are difficult to convert into a scalable point of care (POC) and in-home diagnostics. Advantageously, one or more embodiments of the present invention provide a stack of near-critical angle spatial and spectral filters configured into an integrated photonic device which enables detection of sensitive changes in the refractive index of a top layer of the device that can be functionalized to respond to numerous applications.

Figure 1:
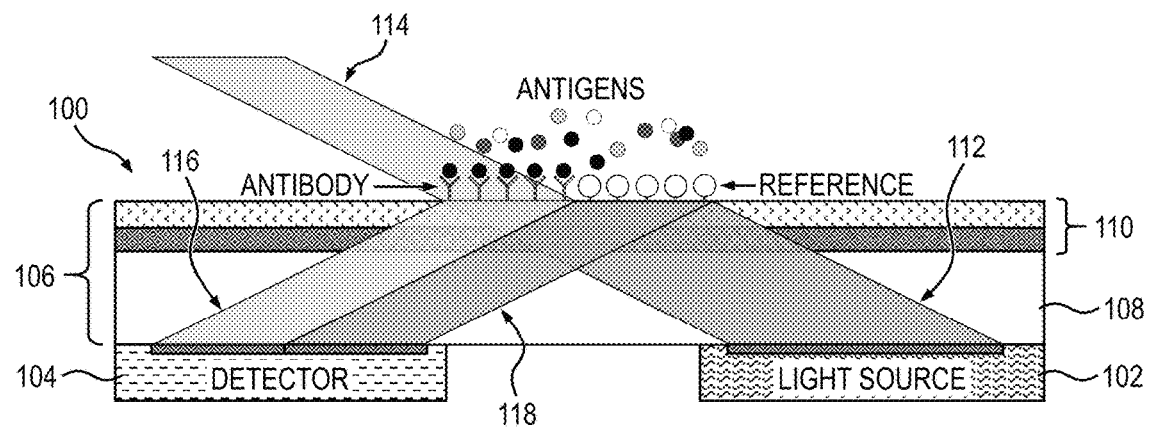
FIG. 1 is a cross-sectional view conceptually depicting an exemplary optical apparatus for detection of selective biomolecule interactions (e.g., virus binding to an adsorbed antibody), according to one or more embodiments of the present invention.

FIG. 1 is a cross-sectional view conceptually depicting at least a portion of an exemplary optical apparatus 100 for selective detection of biomolecule interactions, in this case pathogens (e.g., viruses binding to an adsorbed antibody), according to one or more embodiments of the invention. The apparatus 100 comprises a light source 102 and a detector 104 integrated with a filter stack 106. The light source 102 preferably comprises a visible light-emitting diode (LED) or laser diode, but may comprise essentially any device capable of emitting light (visible or invisible) in a prescribed photonics spectrum. For example, in some embodiments higher performance may be obtained with near infrared (e.g., 900-950 nanometers (nm)) LEDs, depending on the application. In this regard, a suitable wavelength of light emitted by the light source will preferably be selected to correspond to the maximum spectral transmission peak of the light transmission structure. The light source wavelength is independent of detection and is solely dependent on the dispersion of the material (e.g., silicon dioxide ($SiO_2$)) used to form the various optical layers in the filter stack. The light source should be chosen to overlap with the maximum spectral transmission peak (see, e.g., FIGS. 6C and 6G).

The detector 104 preferably comprises a photodiode, phototransistor, or camera (two-dimensional (2D) or three-dimensional (3D)), although essentially any device capable of converting light of a desired wavelength into an electrical current can be utilized with embodiments of the invention. Although only a single detector may be employed, one or more embodiments may use multiple detectors for permitting a reference and a measurement channel, as shown in FIG. 1, for achieving improved performance through enhanced measurement accuracy and/or resolution, or reducing the likelihood of false positives. Additionally, having multiple measurement channels may enable the apparatus to concurrently detect multiple target interactions/biomolecules.

With continued reference to FIG. 1, the filter stack 106, in one or more embodiments, is fabricated as a monolithic structure comprising a substrate 108 and a thin film coating 110 including one or more stacked spatial filters disposed on an upper surface of the substrate. The substrate 108 preferably comprises a transparent glass material, such as, for example, optical borosilicate-crown glass (N-BK7) or borosilicate thin glass (D263), of a prescribed thickness. The substrate 108, which is preferably substantially rigid, is used primarily for mechanical support and growth of one or more coatings on its upper surface. In some embodiments, optical coupling techniques, such as a diffraction grating or prisms, can be fabricated on a bottom surface of the substrate for coupling the light source 102 and the detector 104, as will be described in further detail herein. A refractive index of the substrate 108 is preferably selected to be higher than the layers of the near-critical angle spatial filter coating.

The thin film coating 110 is configured to spatially filter internal light using wave interference and strong refraction, so that the light that propagates through the coating is highly spatially and spectrally structured. Additionally, a top layer of the thin film coating 110 is functionalized and acts as a variable mirror, modifying a reflection/transmission ratio between the coating layers proportional to induced changes in the surface refractive index resulting from antigen-antibody binding reactions on an upper surface of the top layer. An incident light wave 112 (or any wave) experiences partial transmittance, evidenced by transmitted light wave 114, and partial reflectance, as evidenced by partially reflected light wave 116, when the medium through which it travels suddenly changes, when considering wave propagation in a medium containing discontinuities. A transmission coefficient describes the amplitude, intensity, or total power of the transmitted light wave 114 relative to the incident light wave 112.

The thin film coating 110 is configured such that when there is no externally induced refractive index change on the upper surface of the top layer, the incident light wave 112 is completely reflected to the detector 104, as evidenced by the completely internally reflected light wave 118. However, when an externally induced refractive index change occurs on the top layer, the incident light wave 112 is partially transmitted through the top layer and scattered, with the remaining light being partially reflected to the detector 104, in one or more embodiments. In other embodiments, there are configurations of the apparatus 100 that have the inverse response; that is, the incident light wave is completely transmitted away from the detector, and only when an externally induced refractive index change occurs on the top layer is the incident light wave reflected back to the detector 104.

The thin film coating 110 according to one or more embodiments of the invention can be beneficially applied as a clinical antibody-based assay for the direct detection of COVID-19 virus. By immobilizing antibodies of interest on a glass surface, the surface becomes functionalized for the direct detection of antigen binding. This binding action displaces water at the upper surface of the thin film coating 110, thereby inducing a surface refractive index change, typically on the order of about $10^{-6}$. The detector 104, in conjunction with corresponding detection circuitry coupled with the detector, is configured to accurately and inexpensively detect this small change in the refractive index.

The biochemistry for preparation of the surface (e.g., silanization) and functionalization (e.g., adsorption) will be known by those skilled in the art. However, optical methods for monitoring molecular interactions on the surface of the device (e.g., SPR, interferometry, etc) have remained challenging; such optical methods for monitoring molecular interactions may be referred to herein as optical-readout methods. Standard optical read-out methodologies often require stable laser systems, precision alignment requiring numerous opto-mechanical mounts, and one-dimensional (1D) or two-dimensional (2D) electronic cameras, often with a trained technician required to operate the system. Advantageously, embodiments of the invention utilize an inexpensive LED light source in conjunction with a specific coating configured to filter the light source both spectrally (i.e., wavelength) and spatially (i.e., angle), resulting in self-alignment to the functionalized surface without the need for precision alignment, and an inexpensive photodiode can be used for the detector, although it is contemplated that various configurations will incorporate a CMOS camera, in one or more embodiments.

Figure 2:
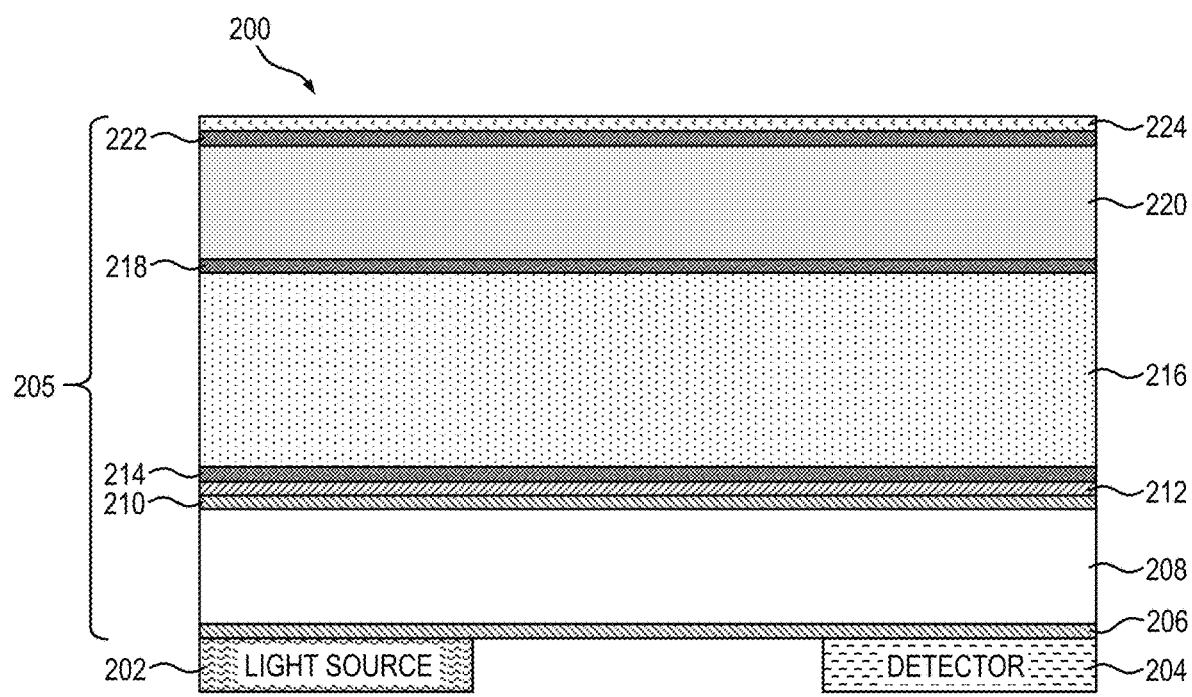
FIG. 2 is a cross-sectional view conceptually illustrating at least a portion of an exemplary apparatus for selective detection of pathogens (e.g., viruses) and/or chemicals, according to one or more embodiments of the present invention.

By way of example only and without limitation, FIG. 2 is a cross-sectional view conceptually illustrating at least a portion of an exemplary optical apparatus 200 for selective detection of biomolecule interactions including a near critical angle anti-reflection thin-film coating stacked to create a spatial (i.e., angular) and spectral (i.e., wavelength) filtering device, according to one or more embodiments of the invention. The apparatus 200, like the exemplary apparatus 100 shown in FIG. 1, comprises a light source 202, which may be implemented using a visible LED or laser diode, a detector 204, which may be implemented using one or more photodiodes or phototransistors, or any other device capable of converting detected light into a current and/or voltage signal, and a light transmission structure 205 coupled with the light source and detector. The light source 202 and detector 204 are spaced apart laterally in a same plane and disposed on an underside of the light transmission structure 205. It is to be appreciated that embodiments of the invention are not limited to the number, type and/or dimensions of the various layers/coatings forming the light transmission structure 205, but rather a light transmission structure having a different arrangement, number, type and/or dimensions of layers is similarly contemplated and within the scope of the present invention.

The light transmission structure 205, in one or more embodiments, comprises a plurality of stacked spatial filtering and other layers and/or coatings. The light transmission structure 205 is carefully configured to create a spatial (i.e., angular) and spectral (i.e., wavelength) filtering device with transmission and reflection characteristics sensitive to the optical properties of a top surface of the device. At least a portion of the upper surface of a top one of the spatial filtering layers in the light transmission structure 205 is modified (e.g., functionalized) to scatter or absorb transmitted light, ending further transmission through the light transmission structure. Again, it is to be understood that the number, dimensions and/or arrangement of the various layers forming the light transmission structure 205 are not restricted to merely the embodiment shown.

In the exemplary embodiment shown in FIG. 2, the light source 202 and detector 204 are attached, via an optical coupling layer 206, to a rigid substrate 208, which provides mechanical support and serves as a foundation for subsequent layer fabrication. The substrate 208 preferably comprises a transparent material having a refractive index of about 1.0-2.0, such as, but not limited to, borosilicate glass, fused silica, sapphire, etc.

The optical coupling layer 206 is configured to optically couple the light source 202 (e.g., photodiode or laser diode) and the measurement detector 204 (e.g., photodetector or camera) to the substrate 208. To accomplish this, the incident angle of light should be near the critical angle. For the light source 202, the optical coupling layer 206 is preferably configured to diffuse the internal light generated by the light source 202 to create a uniform intensity across a prescribed illumination region of the light source. Additionally, the optical coupling layer 206 is preferably configured so as to minimize distortion of the image on a measurement surface of the detector 204.

By way of example only and without limitation, the optical coupling layer 206 may comprise optical epoxy, configured to match indices of refraction of the light source 202 and the substrate 208, a scattering layer whereby random surface texturing of the substrate 208 and light source 202 creates a diffuser that is optically bonded using an index-matching epoxy, a prism bonded to the substrate 208 with an index-matching epoxy and configured to modify the incident angle of light to couple both the light source 202 and the detector 204 to the substrate 208, and/or a microarray of prisms formed on the underside surface of the substrate 208 (e.g., by etching, stamping, bonding, etc.) and configured to optically couple, in a non-contact manner, the light source 202 and detector 204 with the substrate 208.

An anti-reflection coating or layer 210 is formed on an upper surface of the substrate 208, such as by using a standard semiconductor deposition process (e.g., plasma-enhanced chemical vapor deposition (PECVD)). In some embodiments, the anti-reflective coating may comprise a plurality of layers, which can be polarizing or non-polarizing, that is referred to collectively here as layer 210. A high refractive index layer 212 is formed on an upper surface of the anti-reflection coating 210. The high refractive index layer 212 may, in some embodiments, comprise an amorphously grown layer having a relatively high refractive index (e.g., 1.9, 2.1, etc.). Suitable materials for use as the high refractive index layer 212 include, but are not limited to, silicon nitride ($SiN_3$, n «2.0), an oxynitride (e.g., $SiO_xN_y$, n≈1.46-1.9), and indium tin oxide (ITO, n=1.85). Next a near-critical angle, anti-reflective layer 214 is preferably formed on an upper surface of the high refractive index layer 212.

A low refractive index layer 216 is formed on an upper surface of the anti-reflective layer 214. In one or more embodiments, the anti-reflective layer 214 is amorphously grown on the high refractive index layer 212 and has a relatively low refractive index. For example, the refractive index of the anti-reflective layer 214, in some embodiments, is about 0.001 less than the refractive index of the low refractive index layer 216. A cross-sectional thickness of the anti-reflective layer 214 is configured to provide near-critical angle reflection in the medium and is preferably determined using principles of thin-film interference. As will be understood by those skilled in the art, thin-film interference is a natural phenomenon wherein light waves reflected by the upper and lower boundaries of a thin film interfere with one another to either enhance or reduce the reflected light.

The low refractive index layer 216, in one or more embodiments, is an amorphously grown layer with a relatively low refractive index. Suitable materials for use as the low refractive index layer 216 include, but are not limited to, silicon dioxide ($SiO_2$, n=1.46), an oxynitride (e.g., $SiO_xN_y$, n≈1.46-1.9), and porous silicon dioxide (e.g., $pSiO_2$, n≈1.30-1.50). A cross-sectional thickness of the low refractive index layer 216 can be determined by a distance of lateral displacement due to refraction required in the device to meet prescribed parameters. The greater the thickness of the low refractive index layer 216, the greater the displacement; that is, the lateral distance between "reference," "detection," and "measurement" regions in the device is determined as a function of the thickness of the low refractive index layer 216. With regard to the anti-reflective coating 210, depending on the refractive index of the substrate 208, the anti-reflection coating 210 can be a simple oblique angle, quarter-wavelength coating, or a near-critical angle, anti-reflection coating if the substrate and the low refractive index layer 216 have similar refractive indices.

In the exemplary embodiment shown in FIG. 2, another near-critical angle, anti-reflective layer 218 is formed on an upper surface of the low refractive index layer 216. In one or more embodiments, the anti-reflective layer 218 is substantially identical to the anti-reflective layer 214 in terms of material type, refractive index and dimensions. A high refractive index layer 220 is formed on an upper surface of the anti-reflective layer 218. In one or more embodiments, the high refractive index layer 220 is substantially identical to the high refractive index layer 212 in terms of material type and refractive index, but not necessarily dimensions; preferably, the high refractive index layer 220 is greater in thickness relative to the high refractive index layer 212. Another anti-reflective layer 222 is preferably formed on an upper surface of the high refractive index layer 212. Finally, a specialized top layer 224 is formed on an upper surface of the anti-reflective layer 222.

One function of the high refractive index layer 220 is to shield the underlying layers in the light transmission structure 205 from infrared light and act as a thermal buffer layer between an infrared absorption layer, which may be disposed above the high refractive index layer 220, and the underlying layers. Certain materials, such as ITO, are highly reflective to infrared light and can serve to reflect incident infrared light that has passed through the low-refractive index layer 224 and the anti-reflective layer 222, back through the light transmission structure 205, thereby effectively doubling the light path length and increasing infrared absorption. In one or more embodiments, the anti-reflective layer 222 may be identical to the anti-reflective layers 214 and 218 in terms of material, refractive index and dimensions. In one or more embodiments, one or more of the various layers in the light transmission structure 205 are deposited using a standard semiconductor fabrication process, such as, for example, PECVD.

For pathogen detection, the top layer 224 is a functionalized layer including immobilized antibodies which are specific to the pathogen being targeted for detection, which changes its refractive index accordingly. Similarly, for chemical detection, the top layer 224 is functionalized to include a polymer that absorbs chemical vapors and changes its refractive index as a result. In either case, the top layer 224 is configured having a refractive index that changes in response to a reaction on a surface of the top layer with a specific pathogen or chemical being targeted for detection.

In some embodiments, multiple channels can be defined on the surface of the top layer 224 by functionalizing one or more defined regions of the top layer for multiple pathogens and/or chemicals. A reference channel (e.g., shown in FIG. 1) can be defined by masking a defined region on the surface of the top layer 224 so that it does not interact with pathogens or chemicals. In this multiple detection channel embodiment, each channel has its own independent internal light detector corresponding thereto. The inclusion of a reference channel enables greater tolerance in fabrication and performance and achieves improved accuracy in detection.

In accordance with one or more embodiments, for biochemical detection, a first step in functionalizing the surface of the top layer (e.g., 224 in FIG. 2) is salinization—the covering of a surface with organofunctional alkoxysilane molecules—which permits improved adsorption of the molecules to the glass surface. For virus detection, antigen-specific antibodies or affibody molecules are adsorbed to the surface.

There are multiple contemplated ways in which biomolecule detection can be implemented, according to embodiments of the invention. By way of example only and without limitation, suitable detection methods include direct refractive index change detection, evanescent wave detection, and surface plasmon resonance (SPR) detection. Each of these exemplary detection methods, which will be described in further detail herein below with reference to FIGS. 3A, 4A and 5A, can be used in conjunction with a light transmission structure formed in accordance with embodiments of the invention.

With continued reference to FIG. 2, the top layer 224, in one or more embodiments, comprises a layer or thin-film coating of low refractive index material having embedded nanoparticles that is physically structured to permit the scattering or exiting of light from the thin-film coating. This configuration is possible because infrared energy (i.e., heat) can be transferred through the material to the interface between the top layer 224 and the underlying anti-reflective layer 222, which is where the reflection/transmission ratio is most sensitive to refractive index changes. This same approach can be used for chemical sensing, since the top layer 224 would comprise a polymer that can be patterned into a scattering surface.

For pathogen (e.g., virus) detection, patterning the surface of the top layer 224 is not readily possible, since the layer of immobilized antibodies (n=1.38) is very thin (e.g., about 15 nanometers) and requires direct exposure to the pathogen. Thus, for virus detection, samples of blood, saliva, or nasal swabs with possible viral infection are preferably collected and placed in a buffer solution, such as, for example, phosphate-buffered saline (PBS). This buffered solution is applied to the functionalized top layer surface comprising immobilized antibodies for viral detection. The virus particles, if present, will bind to the antibodies and cause a small change in the refractive index. The buffered solution (e.g., PBS) can be allowed to evaporate, either passively or actively (e.g., using dry air flow or heat), leaving behind a residual salt layer (e.g., sodium chloride, n=1.54) above the immobilized antibodies. This salt layer has a refractive index that is higher than the immobilized antibody/virus layer, is random and non-uniform, thereby providing scattering and exiting of the transmitted internal light.

Figure 3A:
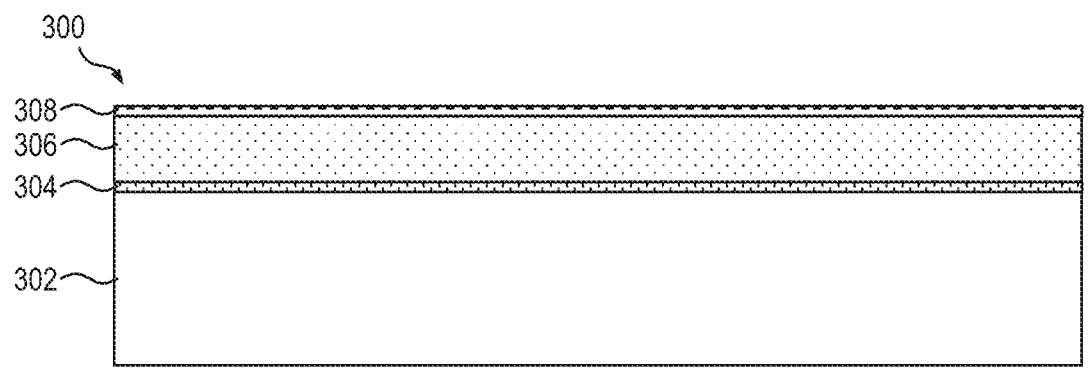
FIG. 3A is a cross-sectional view depicting at least a portion of an exemplary light transmission structure for solid-layer-to-solid-layer transmission, according to one or more embodiments of the present invention.
Figure 4A:
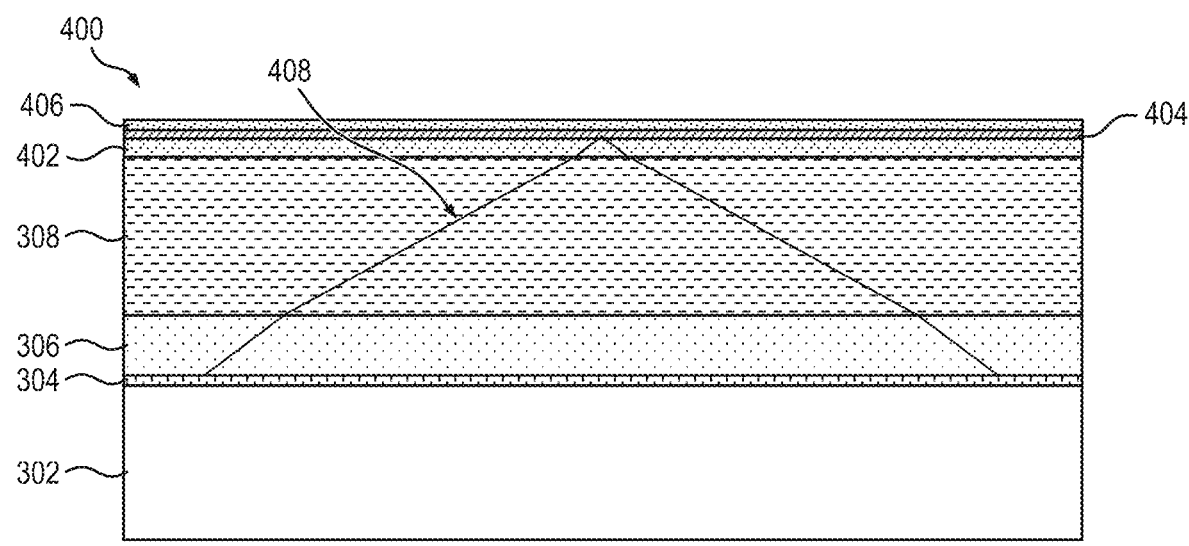
FIG. 4A is a cross-sectional view depicting at least a portion of an exemplary light transmission structure for solid-layer-to-solid-layer transmission having lateral displacement, according to one or more embodiments of the present invention.
Figure 5A:
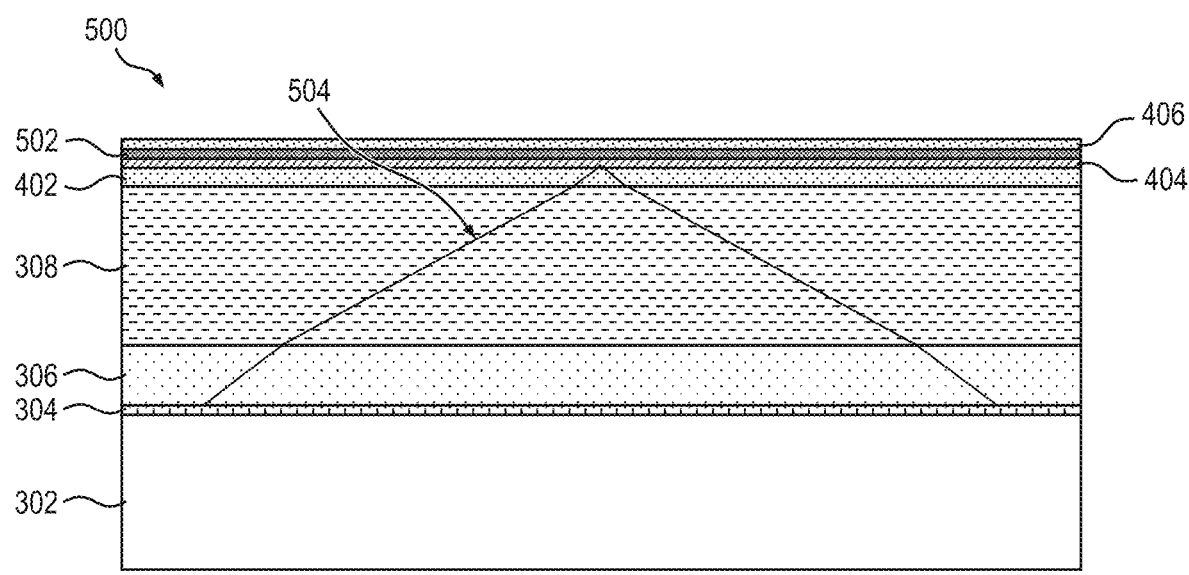
FIG. 5A is a cross-sectional view depicting at least a portion of an exemplary light transmission structure for solid-layer-to-solid-layer transmission having both lateral displacement and polarization discrimination of reflected and transmitted light, according to one or more embodiments of the present invention.

By way of example only and without limitation, FIGS. 3A, 4A and 5A are cross-sectional views depicting at least a portion of alternative embodiments of exemplary light transmission structures suitable for use in an optical apparatus (including a light source and detector) formed in accordance with one or more embodiments of the invention. With reference initially to FIG. 3A, at least a portion of a simplified embodiment of an exemplary light transmission structure 300 is shown which includes a substrate 302 supporting a plurality of stacked thin-film coatings/layers. The substrate 302 preferably comprises a transparent glass material, such as, for example, optical borosilicate-crown glass (N-BK7) or borosilicate thin glass (D263), of a prescribed thickness.

The light transmission structure 300 further comprises at least one near critical angle anti-reflection coating/layer (NCA-ARC) for dielectric-dielectric transmission (although not limited to transmission between dielectrics), with the light source (e.g., 102 in FIG. 1) and detector (e.g., 104 in FIG. 1) operatively coupled to the substrate 302. For example, the light source and detector can be directly bonded to a bottom surface of the substrate, or alternatively a prism can be bonded to the bottom of the substrate 302, in which case the light source and detector can be in free space (i.e., air). It is to be appreciated that unlike other anti-reflective coatings, embodiments of the invention are not necessarily designed for efficient light transmission from a solid layer to air, but instead are configured for light transmission from a solid layer into another solid layer (e.g., dielectric-dielectric).

As will be understood by those skilled in the relevant art, the critical angle is defined as the angle of incidence that provides an angle of refraction of 90 degrees; the critical angle is an angle of incidence value. Consider two different media, medium i (incident medium) and medium r (refractive medium). Stated differently, the critical angle, $\theta_c$, is the incident angle, $\theta_i$, that gives a refractive angle, $\theta_r$, value of 90 degrees. If this information is substituted into the Snell's Law equation, a generic equation for predicting the critical angle for light traveling through two different media can be derived as follows:

$$\theta_c = \sin^{-1}\left(\frac{n_r}{n_i}\right), \quad (1)$$

where $n_r$ is the refractive index of medium r and $n_i$ is the refractive index of medium i.

With continued reference to FIG. 3A, a coupling and enhancing layer 304 is preferably formed on an upper surface of at least a portion of the substrate 302. A first NCA-ARC layer 306 is formed on an upper surface of at least a portion of the coupling and enhancing layer 304, and a second (top) NCA-ARC layer 308 is formed on at least a portion of an upper surface of the first NCA-ARC layer 306. In embodiments where the light source and detector are directly bonded to the substrate 302, without using an optical prism or other intervening structure or layer therebetween, the coupling and enhancing layer 304 may be omitted.

When the coupling and enhancing layer 304 is at a defined thickness, it functions, at least in part, to improve a responsivity of the optical device when using a polarized (e.g., S- or P-polarized) light source. Consequently, the coupling and enhancing layer 304 still provides improved performance even when the light source and detector are directly bonded to the substrate 302 (i.e., without an intervening structure), and thus the coupling and enhancing layer 304 is preferably used regardless of the coupling method.

The light transmission structure 300 can be functionalized for detecting biomolecule interactions by making the top layer 308 a functionalized layer. For infrared detection, layer 308 preferably comprises silicon dioxide or the like, but would be changed to adsorbed molecules for detection of biomolecule interactions. Design rules for the other layers in the light transmission structure 300 would remain the same. The refractive index of layer 306 would still need to be close to that of layer 308; there are a wide range of refractive indices for different biomolecules that depend on the molecule size and how it is adsorbed.

For preferred operation, layer 308 is textured to scatter transmitted light out of the structure; structuring (i.e., texturing) an upper surface of the top layer of the light transmission structure is generally necessary for all non-total internal reflection polarization embodiments (e.g., FIGS. 3A and 4A), but this is really only practical for infrared (IR) imaging when the top surface is silicon dioxide glass. For detecting biomolecule interactions, the bound biomolecules can scatter the light, and if not, a PBS solution applied to layer 308 can be evaporated leaving salt crystals behind to serve as the scattering surface.

By way of example only and without limitation, FIG. 3B is a table 350 presenting some materials and corresponding parameters for each of the layers forming the illustrative light transmission structure 300 shown in FIG. 3A, according to an embodiment of the invention. With reference to FIG. 3B, refractive indices for the respective layers are assigned, with the substrate 302 having a refractive index n0, the coupling and enhancing layer 304 having a refractive index n1, the first NCA-ARC layer 306 having a refractive index n2, and the second NCA-ARC layer 308 having a refractive index n3. The light transmission structure 300 is configured in accordance with prescribed design rules, such that the refractive index n0 of the substrate 302 is less than the refractive index n1 of the coupling and enhancing layer 304 and n1 is greater than the refractive indices n2, n3 of the first and second NCA-ARC layers 306, 308, the refractive index n1 of the coupling and enhancing layer 304 is greater than the refractive index n2 of the first NCA-ARC layer 306, and the refractive index n2 of the first NCA-ARC layer 306 is slightly greater than but substantially equal to the refractive index n3 of the second NCA-ARC layer. As seen in the table 350, the coupling and enhancing layer 304 preferably does not have any significant lateral displacement associated therewith. In this embodiment, the coupling and enhancing layer 304 is formed having the highest index of refraction of all the layers in the light transmission structure 300. This design requires a structured surface to scatter transmitted light out of the coating, such as by increasing a roughness of the top surface of the coating, depositing/etching a diffraction grating or similar structure on the top surface of the coating, etc.

More particularly, the light from a light source (e.g., 202 in FIG. 2) is incident on the interface of the first and second NCA-ARC layers 306, 308. This is the location where the reflection/transmission ratio changes due to infrared (or other) induced changes in the refractive index of layer 308. If the top surface of layer 308 is smooth, as it is natively from deposition, the transmitted light will be reflected, overlapping with the reflected light from the interface between layers 306 and 308, and obscuring the measuring signal. Thus, texturing (i.e., structuring) the top surface of layer 308 to scatter light out of the light transmission structure 300 advantageously improves detection by eliminating the transmitted light. As will be described below, as more layers are added, particularly a polarizing layer, the structured top surface can be eliminated (significantly simplifying fabrication). By using a polarization mechanism, the transmitted and reflected light can overlap at the detector and a polarizer is used to select one or the other to be measured. In one or more embodiments, to functionalize the light transmission structure 300 for detecting biomolecule interactions, the top NCA-ARC layer 308 is replaced with adsorbed molecules.

It is to be appreciated that the detection area is the boundary between layers, and not necessarily the bulk material of the layers. In one or more embodiments, a thickness of the second NCA-ARC layer 308 is optimized for absorption of infrared light, but only the refractive index change at the boundary between layers 306 and 308 effects the reflection/transmission ratio. This is a unique aspect of the light transmission structure formed in accordance with embodiments of the invention, and beneficially creates opportunity for faster response time and higher sensitivity.

In designing the light transmission structure 300, the optimal thickness selected for a given one of the NCA-ARC layers will be a function of the wavelength of light, phase delay through the layer, the refractive index of the layer, and the angle of the light within the layer and is calculated using the well-known equation for the phase delay related to the characteristic matrix as follows:

$$h = \frac{\lambda \beta}{2\pi n_1 \cos\theta}, \quad (2)$$

where h is the layer thickness in nanometers, λ is the wavelength of the light in nanometers, β is the phase delay in radians, $n_1$ is the refractive index of the layer, and θ is the angle in degrees of the light inside the layer. A well-known textbook (which may be useful for background purposes) describing the design of thin film coatings in general is H. A. Macleod, *Thin-film Optical Filters*, Boca Raton, Fla.: CRC Press/Taylor & Francis, (DLC) 2009052758, (OColC) 176924832, 2010, the disclosure of which is incorporated herein by reference in its entirety for all purposes.

In one or more embodiments, optimal thicknesses for each of the NCA-ARC layers 304, 306 and 308 in the illustrative light transmission structure 300 are determined using equation (2) above, with β=1.5708 radians (90 degrees) and design rules n0<n1>n2>n3. For layer 304, assuming silicon nitride material is used having an index of refraction n1=2.1, an optical thickness h=100 nm is calculated. Acceptable layer thickness is hx, where x=0, 1, 2, 3, . . . (when layer 304 is omitted, x=0 is used). Optimal thickness for NCA-ARC layer 304 is hx, where x=1, 3, 5, . . . (i.e., odd multiples of h). For layer 304, a ±15% thickness defines a range for non-optimal performance. Similarly, an optimal thickness of NCA-ARC layer 306 is determined, using equation (2), as h=3,490 nm, based on silicon dioxide having an index of refraction n1=1.451. Acceptable and optimal layer thickness hx, x=1, 3, 5, . . . . For layer 306, a ±15% thickness defines a range for non-optimal performance. For NCA-ARC layer 308, silicon dioxide material is assumed having an index of refraction n1=1.450. However, the thickness of this layer 308 is non-critical, assuming the top surface is structured so that transmitted incident light is scattered out of the light transmission structure 300.

For optimal performance, the materials and dimensions for each of the various anti-reflection coating (ARC) layers in the light transmission structure 300 are preferably selected to be near, but less than, the critical angle, in accordance with one or more embodiments. Furthermore, it is preferred that the primary NCA-ARC layers of the light transmission structure 300 are comprised of the same material, having a refractive index difference, Δn, between adjacent layers that is very small, for example Δn less than about 0.01, and preferably Δn less than about 0.001.

FIG. 4A is a cross-sectional view depicting at least a portion of an exemplary light transmission structure 400, according to another embodiment of the invention. The light transmission structure 400 is similar to the illustrative light transmission structure 300 shown in FIG. 3A, except that it has been modified to provide solid-layer-to-solid-layer transmission (e.g., dielectric-dielectric transmission) with lateral displacement. To accomplish this, the light transmission structure 400 is formed having an increased thickness of the second NCA-ARC layer 308, compared to the light transmission structure 300 shown in FIG. 3A, and adds additional NCA-ARC layers (402 and 404) and a structured top surface configured to scatter light out of the light transmission structure 400 in a manner consistent with the light transmission mechanism previously described in connection with the structure 300 shown in FIG. 3A.

Specifically, the light transmission structure 400 includes a third NCA-ARC layer 402 formed on at least a portion of an upper surface of the second NCA-ARC layer 308, and a fourth NCA-ARC layer 404 formed on at least a portion of an upper surface of the third NCA-ARC layer 402. A fifth (top) NCA-ARC layer 406, which may be referred to herein as a surface functionalization layer, is then formed on at least a portion of an upper surface of the fourth NCA-ARC layer 404. In some embodiments, the surface functionalization layer 406 comprises adsorbed biomolecules and/or polymers, but it is not limited to this configuration.

For example, the light transmission structure 400, in one or more embodiments, can be modified for detecting biomolecule interactions by making NCA-ARC layer 404 the functionalized layer and eliminating NCA-ARC layer 406. In this illustrative scenario, layer 404, which is preferably otherwise comprised of silicon dioxide, would be changed to adsorbed molecules. The design rules (see FIG. 4B) for the other layers in the light transmission structure 400 would remain the same. An upper surface of layer 404 would still need to be textured in order to scatter the transmitted light. Layer 406 is only a functionalized layer for detection using SPR, in which case layer 406 would preferably comprise a metal with adsorbed molecules on the top surface. Layer 406 would not need to be textured to scatter light when using an SPR detection methodology.

The addition of NCA-ARC layers 308, 402 and 404 provides intra-layer lateral displacement by enabling extreme refraction, resulting in lateral displacement of transmitted light through the light transmission structure 400. This embodiment beneficially enables a lateral separation between the light source and detector to be increased compared to a light transmission structure that provides no lateral displacement (e.g., structure 300 shown in FIG. 3A). A light path 408 through the light transmission structure 400 evidences lateral displacement at the interface between NCA-ARC layers 306 and 308.

By way of example only and without limitation, FIG. 4B is a table 450 depicting some materials and corresponding parameters for each of the layers included in the illustrative light transmission structure 400 shown in FIG. 4A, according to an embodiment of the invention. With reference to FIG. 4B, refractive indices for the respective layers are assigned, with the substrate 302 having a refractive index n0, the coupling and enhancing layer 304 having a refractive index n1, the first NCA-ARC layer 306 having a refractive index n2, the second NCA-ARC layer 308 having a refractive index n3, the third NCA-ARC layer 402 having refractive index n2, and the fourth NCA-ARC layer 404 having refractive index n3. The characteristics of the top NCA-ARC layer 406 will vary and are selected depending on what the light transmission structure 400 is being functionalized for and the detection method employed.

The light transmission structure 400 is configured in accordance with prescribed design rules, such that the refractive index n0 of the substrate 302 is less than the refractive index n1 of the coupling and enhancing layer 304, refractive index n1 is greater than the refractive indices n2 and n3 of the first and second NCA-ARC layers 306 and 308, respectively, the refractive index n1 of the coupling and enhancing layer 304 is greater than the refractive index n2 of the first NCA-ARC layer 306, and the refractive index n2 of the first and third NCA-ARC layers 306, 402 is slightly greater than but substantially equal to the refractive index n3 of the second and fourth NCA-ARC layers 308, 404. As seen in the table 450, the second NCA-ARC layer 308 has significant lateral displacement associated therewith, which can be tuned or otherwise controlled as a function of the thickness and material type of this layer; the other NCA-ARC layers have negligible lateral displacement associated therewith. An important aspect to note is that the index of refraction of a boundary between any two adjacent layers in the light transmission structure formed in accordance with one or more embodiments of the invention is less than about 0.01, and preferably less than about 0.001, and close to the critical angle, which is a significant departure from standard optical coatings.

FIG. 5A is a cross-sectional view depicting at least a portion of an exemplary light transmission structure 500, according to yet another embodiment of the invention. The light transmission structure 500 is similar to the illustrative light transmission structures 300 and 400 shown in FIGS. 3A and 4A, respectively, except that it has been modified to beneficially provide both solid-layer-to-solid-layer (e.g., dielectric-dielectric) transmission with both lateral displacement and polarization discrimination of reflected and transmitted light. To achieve these beneficial features, the light transmission structure 500 does not require a top layer adapted for scattering light out of the structure (e.g., by texturing an upper surface of the top layer), but instead includes a top layer configured to provide total internal reflection of the incident light source.

With reference now to FIG. 5A, the light transmission structure 500 is formed in a manner consistent with the illustrative light transmission structure 400 shown in FIG. 4A, with the addition of an NCA-ARC layer 502, serving as a polarization layer, formed on at least a portion of an upper surface of the NCA-ARC layer 404, and a functionalized top layer 406 formed on at least a portion of an upper surface of the polarization layer 502. The material used to form the top layer 406 will be selected based, at least in part, on the detection methodology and application in which the light transmission structure 500 is employed; that is, top layer 406 functionalizes an upper surface of the polarization layer 502. For example, when using direct detection of refractive index change, NCA-ARC layers 306, 308 and 402 preferably have a refractive index consistent with layer 404, which is comprised of a functionalizing material. When using evanescent wave detection, the top layer 406 comprises adsorbed antibodies. When using SPR detection, the top layer 406 comprises a metal with adsorbed molecules on the top surface. When using an infrared camera as the detector, detection occurs by absorption of infrared light into the NCA-ARC layer 404, changing its refractive index, which thereby proportionally changes the amount of light reflected back to the detector.

In order to achieve polarization of the transmitted light (which is then totally internally reflected), the light transmission structure 500 utilizes a polarized light source and a polarizer (i.e., a polarizing filter) disposed in front of the detector. This polarizer can be implemented, in one or more embodiments, as a discrete component that is coupled (e.g., bonded) to the substrate 302 or simply placed between the substrate and the light source and detector. Alternatively, the polarizer may comprise a thin film deposited on at least a portion of the substrate 302, for example using a standard deposition process (e.g., PECVD). This is a significant improvement, as it simplifies the nanofabrication process (primarily because the top surface of the light transmission structure no longer needs to be textured), enables the measured signal to be either the reflected or transmitted light of the NCA-ARC, and permits detection of the top functionalized surface utilizing evanescent field detection. Thus, the light transmission structure 500 achieves both lateral displacement and polarization discrimination of reflected and transmitted light.

A light path 504 through the light transmission structure 500 evidences lateral displacement at the interface between NCA-ARC layers 306 and 308; this is consistent with the light transmission structure 400 shown in FIG. 4A. Path 504 shows displacement and reflected light from the interface between layers 402 and 404, plus reflected transmitted light (polarization now rotated 90 degrees) from the interface between layers 404 and 502. Layer 404 is very thin (e.g., about 100 nm), and thus the reflected light and reflected transmitted light paths will be substantially collinear.

Unpolarized light comprises two primary orthogonal linear polarization states that are most important for reflection and transmission, referred to as P- and S-polarization. P-polarized light has an electric field polarized parallel to the plane of incidence, while S-polarized light is perpendicular (i.e., transverse) to this plane; that is, S- and P-polarization are defined as having a phase difference of 90 degrees relative to one another. In this illustrative embodiment, the light source is first polarized, selecting either S- or P-polarization. In the scenario at hand, S-polarization has more advantages than P-polarization, and therefore a light source having S-polarization is preferred. The light passes through the light transmission structure 500 and, upon hitting the boundary between NCA-ARC layer 404 and the polarization layer 502, is totally internally reflected, which results in a polarization change (there is only a polarization change when light reflects via total internal reflection).

Tuning of the refractive index of the polarization layer 502 relative to NCA-ARC layer 404 is required to achieve a 90-degree polarization phase shift. The relative refractive index, N, of two adjacent mediums can be determined generally as follows:

$$N = \frac{n2}{n1}, \tag{3}$$

where n1 is the refractive index of the incident medium and n2 is the refractive index of the refractive medium. The phase change of S-polarized light, $\delta_S$, that occurs for total internal reflection can be determined using the following equation:

$$\tan\frac{\delta_S}{2} = \frac{\sqrt{\sin^2\theta - N^2}}{\cos\theta}. \tag{4}$$

Similarly, the phase change of P-polarized light, $\delta_P$, that occurs for total internal reflection can be determined using the following equation:

$$\tan\frac{\delta_P}{2} = \frac{\sqrt{\sin^2\theta - N^2}}{N^2\cos\theta}. \tag{5}$$

In one or more embodiments, the refractive index of the polarization layer 502 is determined by solving equations (3) through (5) above so that the incident S-polarized light has its polarization rotated by 90 degrees, effectively changing it to P-polarized light. This light is reflected back towards the detector.

In the embodiment shown in FIG. 5A, all of the light that passes through the light transmission structure 500 is reflected back to the detector; the ratio of S- and P-polarization of that light changes proportionally as a function of the transmission/reflection ratio between layers 404 and 502. A polarizer disposed in front of the detector selects one of the polarizations to be the measured signal.

The top layer 406 is configured so that no light, or nearly no light, is scattered out of the light transmission structure 500. Rather, transmitted light is totally internally reflected towards the detector with a 90-degree polarization phase shift. The total internal reflection generates an evanescent wave that interacts with a functionalized surface of the top layer 406 and results in detection. The evanescent wave can also be used to enhance sensitivity for infrared imaging by functionalizing the top surface of layer 406 with a polymer and appropriately selecting a refractive index for the top layer 406.

By way of example only and without limitation, FIG. 5B is a table 550 depicting some materials and corresponding parameters for each of the layers included in the illustrative light transmission structure 500, according to an embodiment of the invention. With reference to FIG. 5B, refractive indices for the respective layers are assigned, with the substrate 302 having a refractive index n0, the coupling and enhancing layer 304 having a refractive index n1, the first NCA-ARC layer 306 having a refractive index n2, the second NCA-ARC layer 308 having a refractive index n3, the third NCA-ARC layer 402 having refractive index n2, the fourth NCA-ARC layer 404 having refractive index n3, and the fifth NCA-ARC layer 502 having refractive index n4, and the top layer 406 having a refractive index functionalized for a particular detection methodology and application.

The light transmission structure 500 is configured in accordance with prescribed design rules, such that the refractive index n0 of the substrate 302 is less than the refractive index n1 of the coupling and enhancing layer 304, refractive index n1 is greater than the refractive indices n2 and n3, the refractive index n1 of the coupling and enhancing layer 304 is greater than the refractive index n2 of the first NCA-ARC layers 306 and 402, the refractive index n2 of the first and third NCA-ARC layers 306, 402 is slightly greater than but substantially equal to the refractive index n3 of the second and fourth NCA-ARC layers 308, 404, and the refractive index n4 of the NCA-ARC layer 406 is selected so as to provide total internal reflection, resulting in a 90-degree phase change in the reflected light. As seen in the table 550, the second NCA-ARC layer 308 has significant lateral displacement associated therewith, consistent with the light transmission structure 400 shown in FIG. 4A, which may be tuned or otherwise controlled as a function of the thickness and material type of this layer; the other NCA-ARC layers have negligible lateral displacement associated therewith. Moreover, the addition of layer 502 provides a 90-degree phase change, thereby beneficially enabling the light transmission structure 500 to achieve both solid-layer-to-solid-layer transmission with lateral displacement and polarization discrimination of reflected and transmitted light. As apparent from the table 550, the NCA-ARC layers are all closely matched, with the layers preferably being formed of the same material (e.g., silicon dioxide) and having refractive indices that are within about 0.001 of one another for adjacent layers.

Figure 6A:
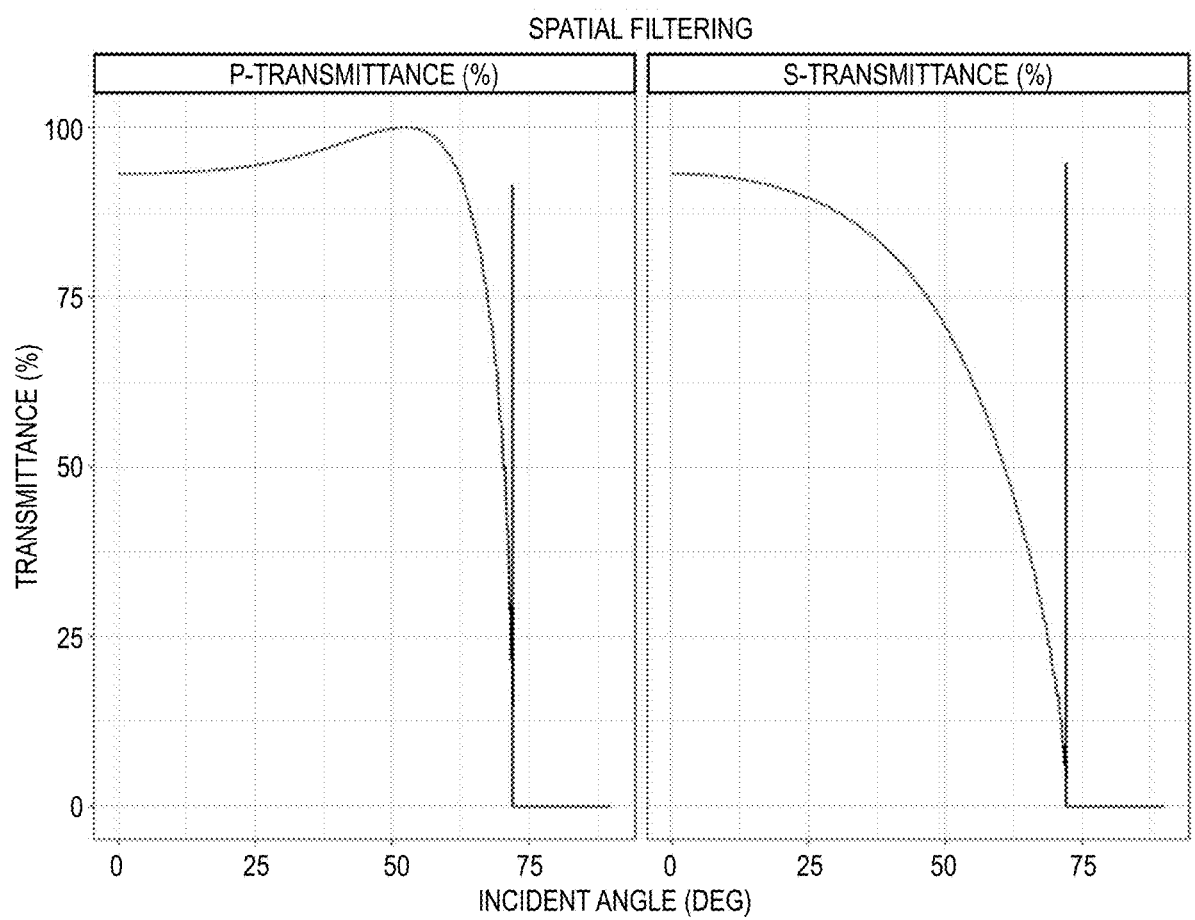
FIGS. 6A through 6G are graphs conceptually depicting exemplary design performance characteristics for illustrative light transmission structures, according to embodiments of the present invention.
Figure 6B:
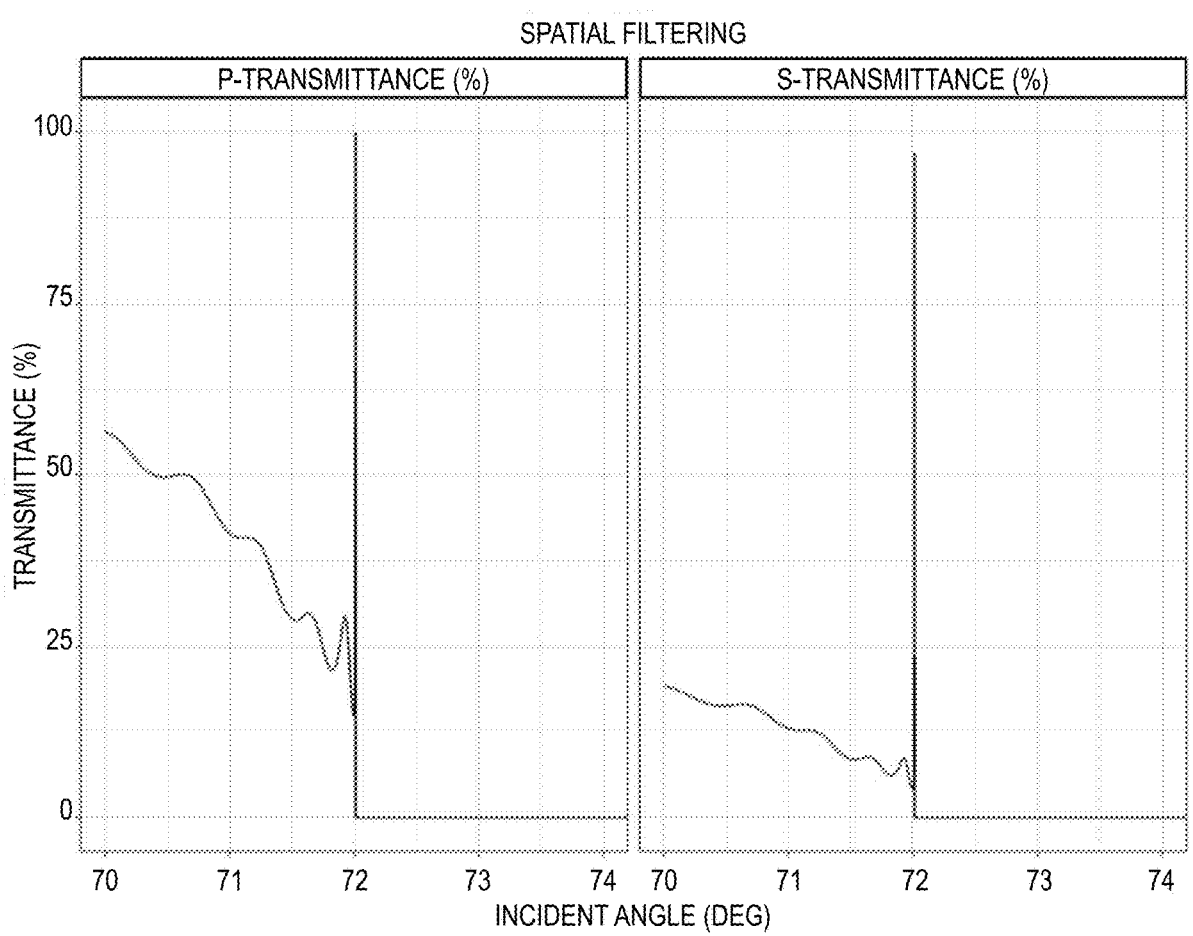

By way of example only and without limitation, FIGS. 6A through 6G are graphs conceptually depicting exemplary design performance criteria for an illustrative light transmission structure, according to one or more embodiments of the invention. In FIG. 6A, graphs illustrate the transmittance percentage versus incident angle for P- and S-polarized light through the exemplary light transmission structure. Specifically, FIG. 6A depicts spatial filtering optimal performance. For this exemplary embodiment, the coupling and enhancing layer 304 has a thickness h of 102 nm, or hx, x=1, 3, 5, . . . (odd integers). As apparent from FIG. 6A, a spike in transmittance at about 72 degrees represents a critical angle of the light transmission structure. This transmission spike is what the NCA-ARC coating creates. Without the coating there would be nearly zero transmission at the angle of incidence; its proximity to the critical angle makes it sensitive to the value of the critical angle, which is defined by the refractive indices of the NCA-ARC layers. This is what provides high sensitivity. FIG. 6B are graphs showing a close-up of the exemplary transmittance versus incident angle waveforms for P- and S-polarized light shown in FIG. 6A in a range of incident angle from 70 to 74 degrees.

Figure 6C:
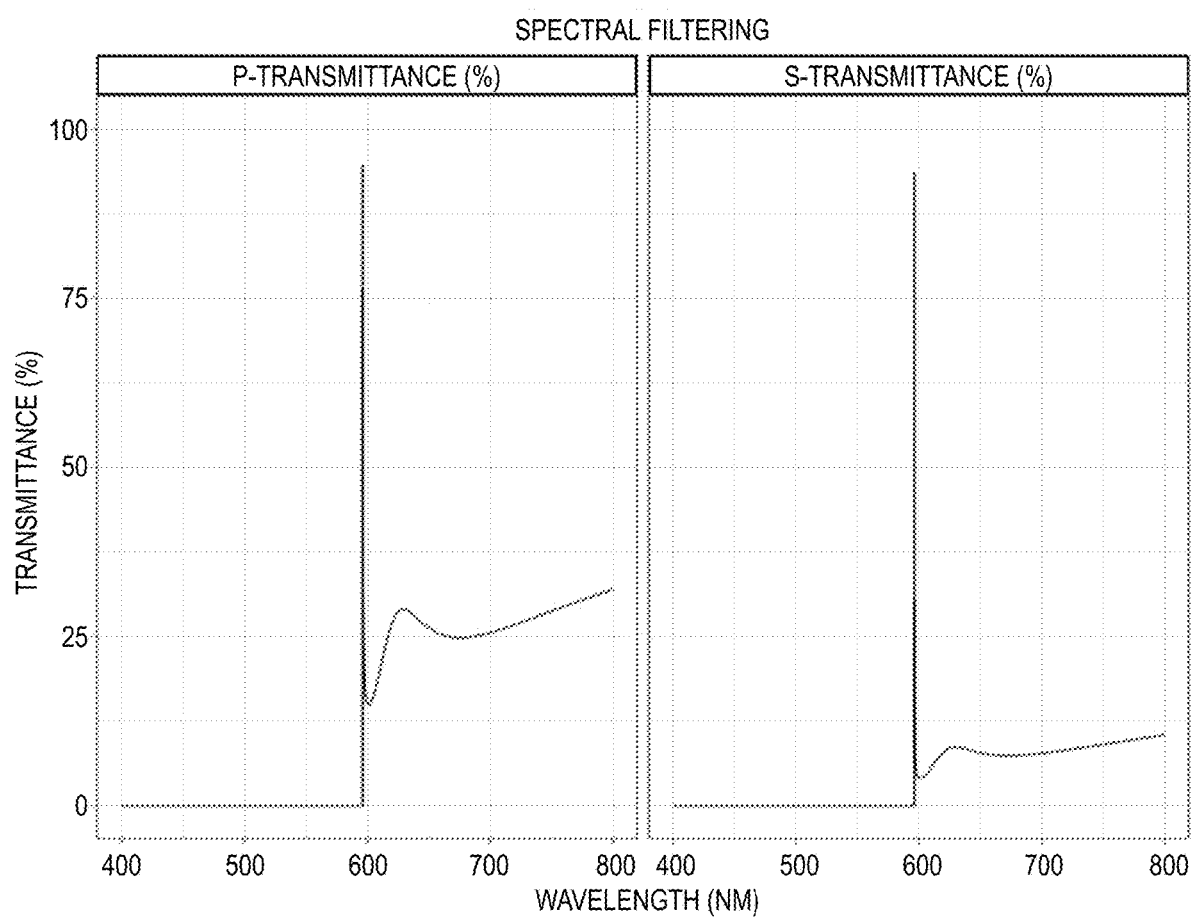

FIG. 6C are graphs showing transmittance percentage versus wavelength of the incident light for P- and S-polarized light through the light transmission structure. Specifically, FIG. 6C depicts spectral filtering optimal performance. Specifically, FIG. 6A depicts spatial filtering optimal performance. For this exemplary embodiment, the coupling and enhancing layer 304 has a thickness h of 102 nm, or hx, x=1, 3, 5, . . . (odd integers). As apparent from FIG. 6C, there is a spike in transmittance at a wavelength of about 595 nm.

Figure 6D:
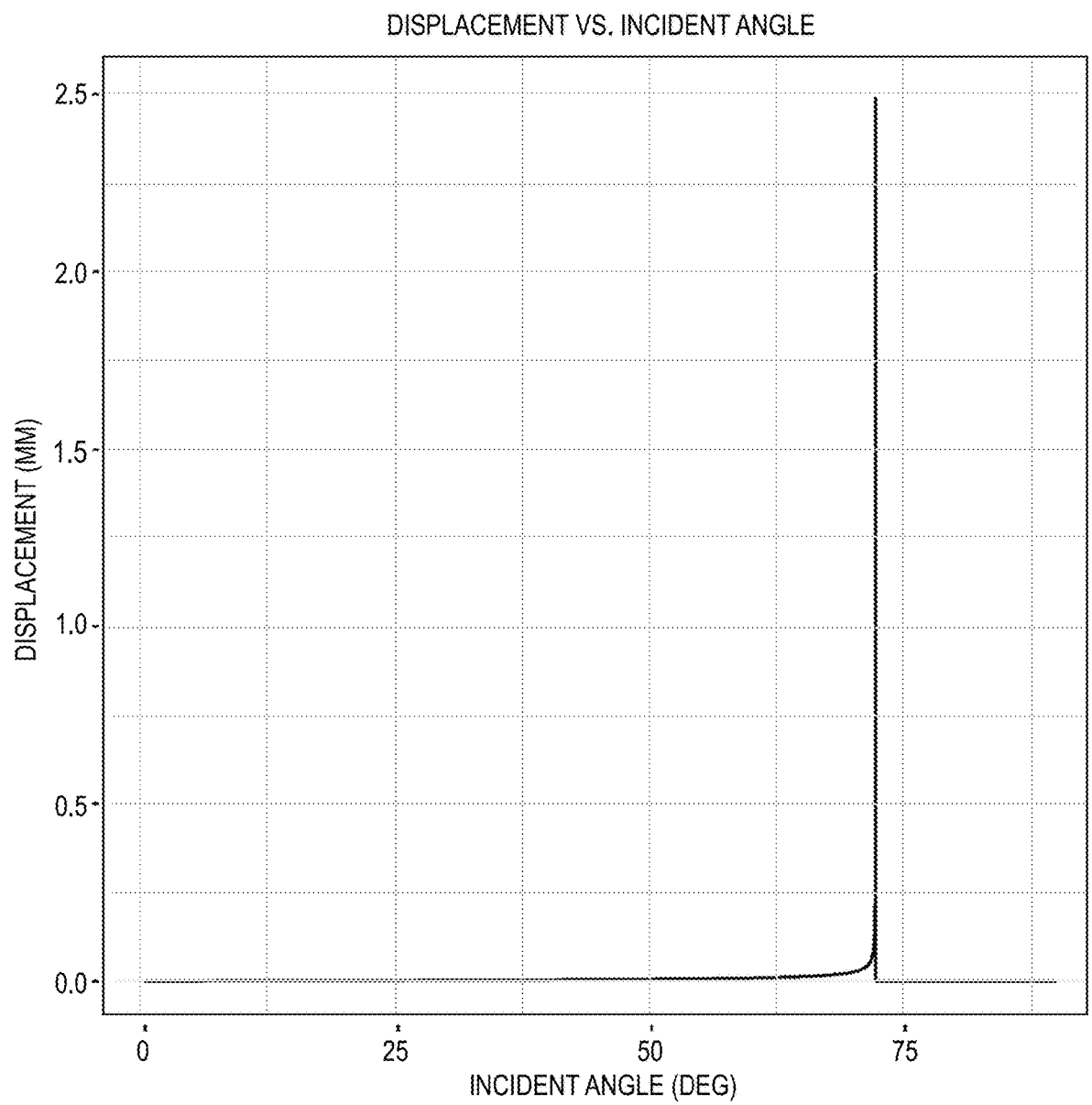

FIG. 6D is a graph illustrating displacement versus incident angle in the exemplary light transmission structure. As apparent from FIG. 6D, near the critical angle of about 72 degrees, there is a lateral displacement of 2.5 nm for light traveling from the bottom to the top of the light transmission structure. Total lateral displacement in the light transmission structure (i.e., bottom to top to bottom of the structure) will be twice this value, or 5.0 nm. Lateral displacement is the same for optimal (odd integers) and acceptable (even integers) performance designs.

Figure 6E:
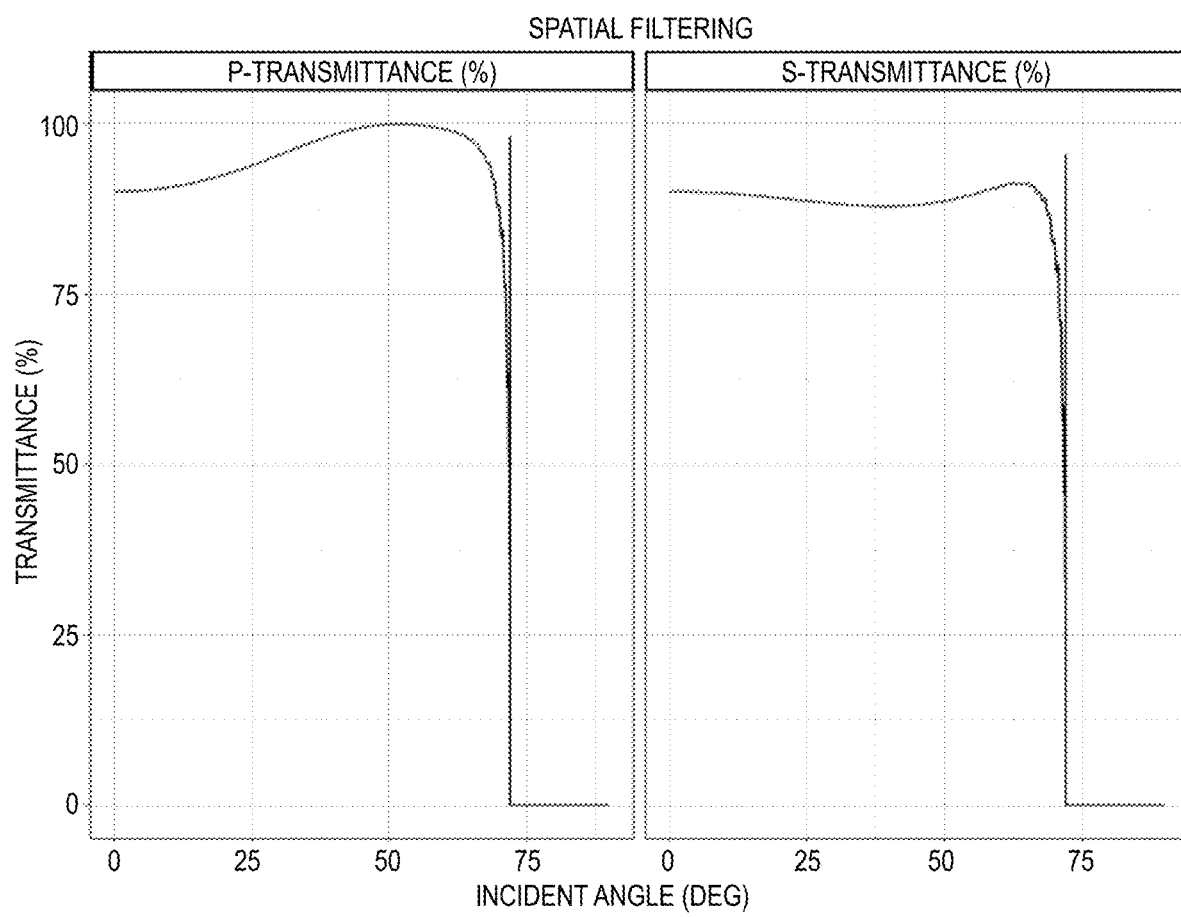
Figure 6F:
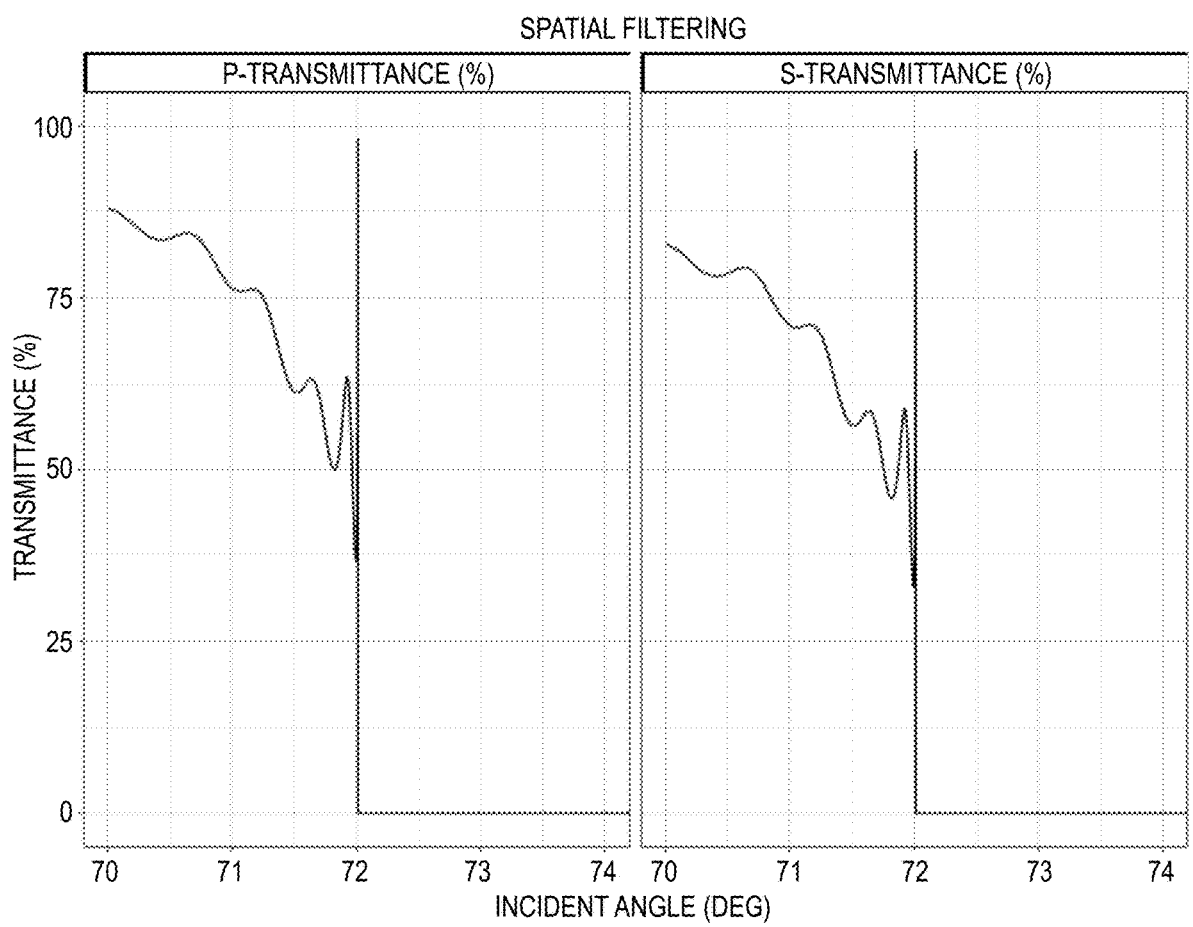

FIG. 6E are graphs illustrating transmittance percentage versus incident angle for P- and S-polarized light through the exemplary light transmission structure. Specifically, FIG. 6E depicts spatial filtering acceptable (non-optimal) performance. This exemplary embodiment is consistent with the embodiment shown in FIG. 6A, except that the coupling and enhancing layer 304 has a thickness h of 204 nm, or hx, x=0, 2, 4, . . . (even integers). At a critical angle of about 72 degrees, transmittance in the structure essentially drops to near zero, evidencing sharp spatial filtering provided by the light transmission structure. FIG. 6F are graphs showing a close-up of the exemplary transmittance versus incident angle waveforms for P- and S-polarized light shown in FIG. 6E in a range of incident angle from 70 to 74 degrees.

Figure 6G:
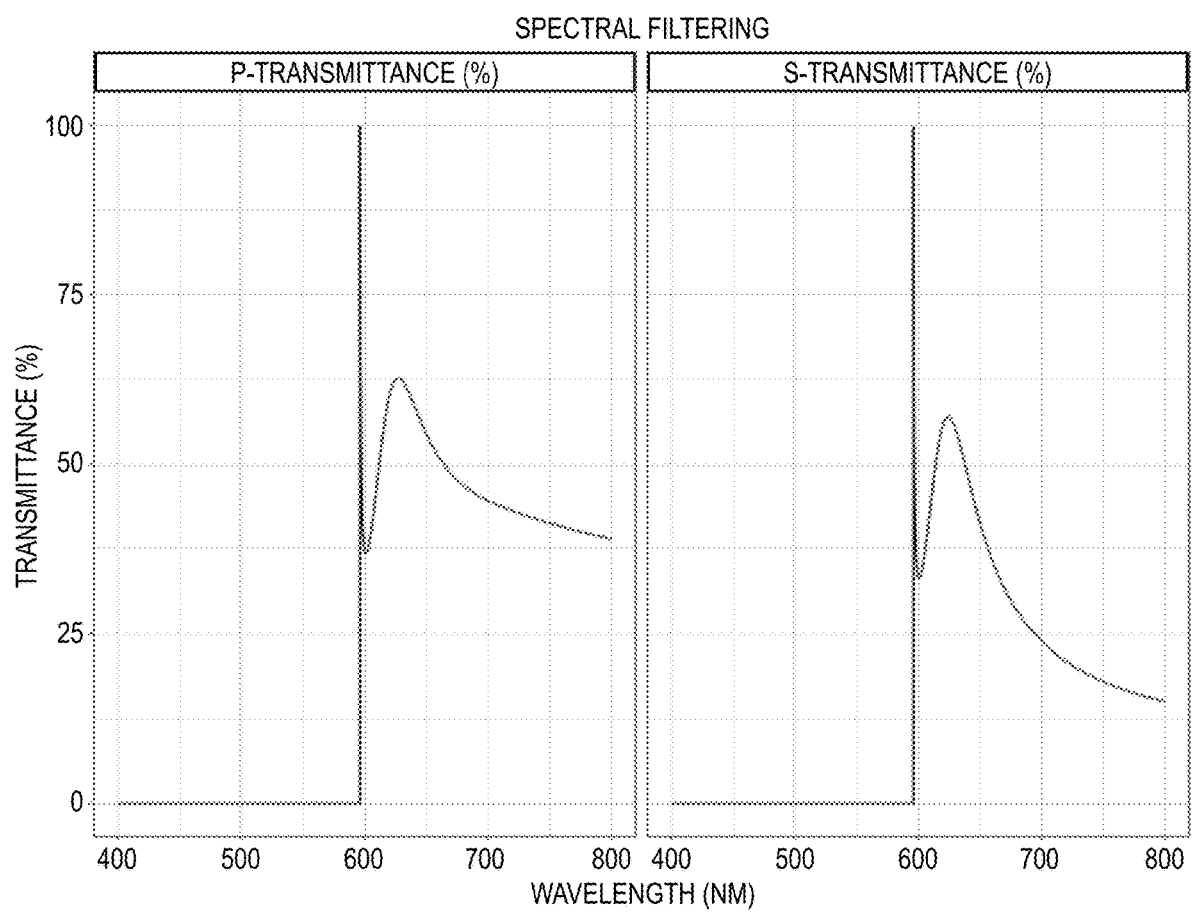

FIG. 6G are graphs showing transmittance percentage versus wavelength of the incident light for P- and S-polarized light through the light transmission structure. Specifically, FIG. 6C depicts spectral filtering acceptable (non-optimal) performance. This exemplary embodiment is consistent with the embodiment shown in FIG. 6C, except that the coupling and enhancing layer 304 has a thickness h of 204 nm, or hx, x=0, 2, 4, . . . (even integers). As apparent from FIG. 6G, there is a spike in transmittance at a wavelength of about 595 nm.

Figure 7:
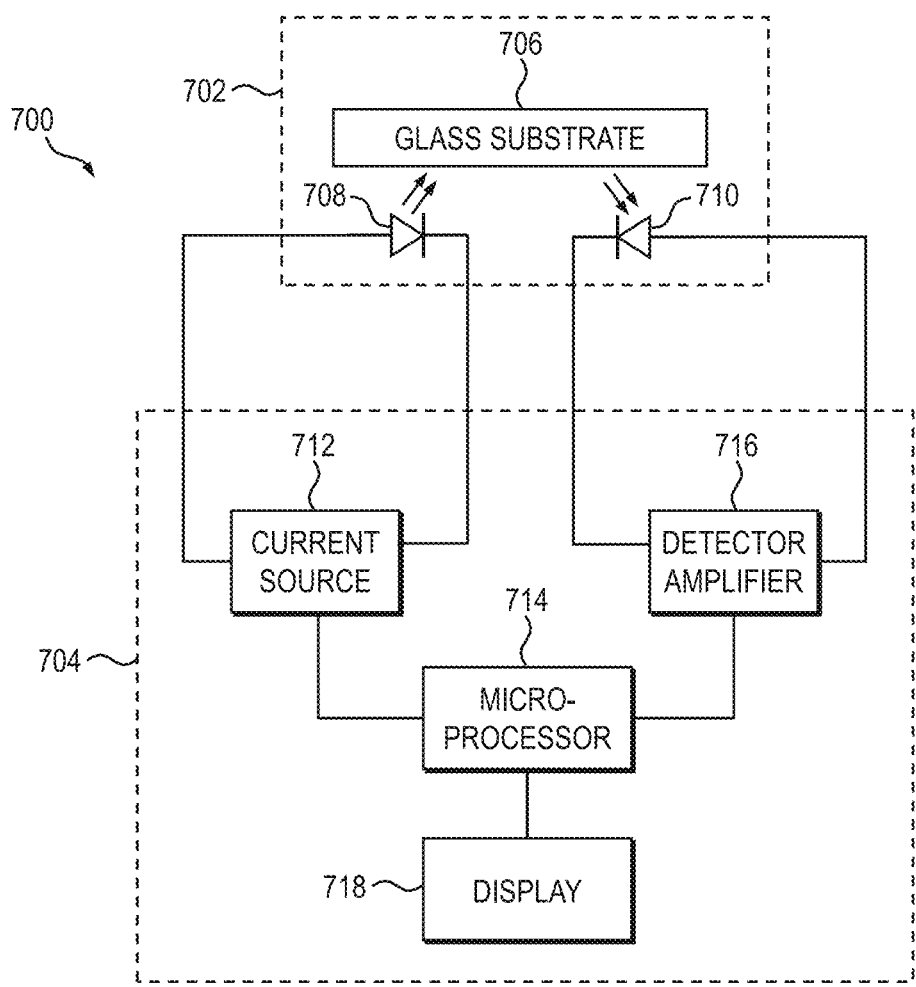
FIG. 7 is a schematic diagram depicting at least a portion of an exemplary apparatus for detecting and indicating the presence of selective biomolecules and/or chemicals, according to one or more embodiments of the present invention.

FIG. 7 is a schematic diagram depicting at least a portion of an exemplary apparatus 700 for detecting and indicating the presence of selective biomolecules and/or chemicals, according to an embodiment of the invention. The apparatus 700 includes an optical detector 702 in operative communication with electronic circuitry 704 configured to process and display detection results of the optical detector. The optical detector 702 includes a light transmission structure 706, which may comprise a glass substrate supporting a plurality of stacked spatial filters thereon, and a light source 708 and detector 710 operatively coupled with the light transmission structure. The light transmission structure 706 is preferably formed in accordance with embodiments of the invention, such as in a manner consistent with any of the various illustrative embodiments of the light transmission structure shown in FIGS. 1, 2, 3A, 4A and 5A.

The light source 708 preferably comprises a visible light-emitting diode (LED) or laser diode, but may comprise essentially any device capable of emitting light (visible or invisible) in a prescribed optical spectrum. A suitable wavelength of light emitted by the light source will preferably be selected as a function of the design of the NCA-ARC layers; specifically, the respective thicknesses and/or material type(s) of the individual layers forming the light transmission structure 706. The detector 710 preferably comprises a photodiode, phototransistor, two-dimensional camera, or three-dimensional camera, although essentially any device capable of converting light of a desired wavelength into an electrical current can be utilized.

The electronic circuitry 704 comprises a current source 712 coupled to the light source 708 and adapted to generate a current that is supplied to the light source for appropriately biasing the light source. An intensity of the light source 708, among other parameters, can be controlled as a function of an amplitude and/or pulse shape, among other parameters, of current generated by the current source 712. Current sources suitable for use with embodiments of the invention will be known by those skilled in the relevant art. The current source 712 is preferably connected with a processor 714, such as a microprocessor, adapted to generate one or more control signals for controlling at least one characteristic (e.g., amplitude, duration, pulse shape, frequency, etc.) of the current generated by the current source.

The electronic circuitry 704 further includes a detector amplifier 716 coupled to the detector 710. The detector amplifier 716 is configured to amplify a photo-current generated by the detector 710, the detected current being indicative of an amount of light generated by the light source 708 and reflected by the light transmission structure 706 back to the detector 710. Suitable changes in the amount of detected light will cause proportional changes in the detected photo-current. These small changes in current are amplified by the detector amplifier 716 and supplied to the processor 714, which is configured to correlate such changes in current with the presence of a selected biomolecule and/or chemical. Often, the photo-current generated by the detector 710 will be nonlinear, so the microprocessor 714, in one or more embodiments, can be configured to normalize the photo-current signal.

The processor 714 is connected to a display 718, or other indication device (e.g., speaker, light, etc.), adapted to present results generated by the processor to indicate the presence or absence of a selected biomolecule and/or chemical. For example, the processor may include an analog-to-digital converter configured to convert the amplified photo-current generated by the detector amplifier 716 to a digital signal. This digital signal may be compared with a threshold or other reference signal, such that when the digital signal matches or exceeds the threshold, an output signal is sent to the display 718 indicating the presence of the selected biomolecule and/or chemical. In this manner, a user can immediately determine the presence or absence of the selected biomolecule and/or chemical in a tested sample.

In a biosensor, it is often necessary to have numerous detection channels as references and/or to detect multiple pathogens and/or biochemicals that could lead to a false positive result. Accordingly, the exemplary apparatus 700 shown in FIG. 7 is intended to be a simplified embodiment for clarity of description. It is to be appreciated, however, that the microprocessor 714, in one or more embodiments, can be configured for operation with a plurality of detectors 708 and a plurality of corresponding light sources 710, as will become apparent to those skilled in the art given the teachings herein.

The apparatus according to embodiments of the invention can be formed, at least in part, using standard semiconductor fabrication techniques, as previously stated. Semiconductor fabrication may utilize, among other techniques, photolithographic patterning, etching, deposition, etc., and conventional semiconductor fabrication tooling. These techniques and tooling will already be familiar to those having ordinary skill in the relevant arts. Moreover, many of the processing steps and tooling used to fabricate semiconductor structures and other semiconductor devices are also described in a number of readily available publications, including, for example: P. H. Holloway et al., *Handbook of Compound Semiconductors: Growth, Processing, Characterization, and Devices*, Cambridge University Press, 2008; and R. K. Willardson et al., *Processing and Properties of Compound Semiconductors*, Academic Press, 2001, which are both hereby incorporated by reference herein in their entireties. It is emphasized that while some individual processing steps may be set forth herein, those steps are merely illustrative, and one skilled in the art may be familiar with several equally suitable alternatives that would also fall within the scope of embodiments of the present invention.

It is to be appreciated that the various structures and/or layers shown in the accompanying figures may not be drawn to scale. Furthermore, one or more structures and/or material layers of a type commonly used in such sensor devices may not be explicitly shown in a given figure for ease of explanation. This does not imply that the structures and/or layer(s) not explicitly shown are omitted in the actual device.

At least a portion of the techniques of the present invention may be implemented in an integrated circuit, either alone or as part of a larger circuit or system. In forming integrated circuits, identical die are typically fabricated in a repeated pattern on a surface of a semiconductor wafer. Each die includes a device described herein, and may include other structures and/or circuits (e.g., detection circuitry, error correction circuitry, etc.). The individual die are cut or diced from the wafer, then packaged as an integrated circuit. One skilled in the art would know how to dice wafers and package die to produce integrated circuits. Any of the exemplary circuits illustrated in the accompanying figures, or portions thereof, may be part of an integrated circuit. Integrated circuits so manufactured are considered part of this invention.

The illustrations of embodiments of the invention described herein are intended to provide a general understanding of the various embodiments, and they are not intended to serve as a complete description of all the elements and features of apparatus and systems that might make use of the circuits and techniques described herein. Many other embodiments will become apparent to those skilled in the art given the teachings herein; other embodiments are utilized and derived therefrom, such that structural and logical substitutions and changes can be made without departing from the scope of this disclosure. The drawings are also merely representational and are not drawn to scale. Accordingly, the specification and drawings are to be regarded in an illustrative rather than a restrictive sense.

Embodiments of the invention are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Terms such as "above" and "below" are used to indicate relative positioning of elements or structures to each other as opposed to relative elevation.

The corresponding structures, materials, acts, and equivalents of all means or step-plus-function elements in the claims below are intended to include any structure, material, or act for performing the function in combination with other claimed elements as specifically claimed. The description of the various embodiments has been presented for purposes of illustration and description, but is not intended to be exhaustive or limited to the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the various embodiments with various modifications as are suited to the particular use contemplated.

The abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus, the following claims are hereby incorporated into the Detailed Description, with each claim standing on its own as separately claimed subject matter.

Given the teachings of embodiments of the invention provided herein, one of ordinary skill in the art will be able to contemplate other implementations and applications of the techniques of embodiments of the invention. Although illustrative embodiments of the invention have been described herein with reference to the accompanying drawings, it is to be understood that embodiments of the invention are not limited to those precise embodiments, and that various other changes and modifications are made therein by one skilled in the art without departing from the scope of the appended claims.

What is claimed is:

1. A light transmission structure for use, in conjunction with a light source and detector, for selective detection of at least one of biomolecule interactions and absorption of infrared light, the light transmission structure comprising:
   a substrate, the substrate having a bottom surface adapted to couple the light source and detector to the light transmission structure;
   an optical coupling and light enhancing layer disposed on at least a portion of an upper surface of the substrate;
   a first near-critical angle anti-reflective layer disposed on at least a portion of an upper surface of the optical coupling and light enhancing layer; and
   at least a second near-critical angle anti-reflective layer disposed on at least a portion of an upper surface of the first near-critical angle anti-reflective layer, an upper surface of the second near-critical angle anti-reflective layer being functionalized and textured so that transmitted incident light is scattered out of the light transmission structure;
   wherein a difference in refractive index between adjacent near-critical angle anti-reflective layers is less than about 0.01.

2. The light transmission structure of claim 1, wherein the upper surface of the second near-critical angle anti-reflective layer is functionalized so that a refractive index of the second near-critical angle anti-reflective layer changes in response to at least one of a reaction with a specific pathogen or chemical being targeted for detection, and absorption of infrared light.

3. The light transmission structure of claim 1, wherein a refractive index of the substrate is less than a refractive index of the optical coupling and light enhancing layer, the refractive index of the optical coupling and light enhancing layer is greater than refractive indices of the first and second near-critical angle anti-reflective layers, and the refractive index of the first near-critical angle anti-reflective layer is slightly greater than and substantially equal to the refractive index of the second near-critical angle anti-reflective layer.

4. The light transmission structure of claim 1, wherein the optical coupling and light enhancing layer comprises silicon nitride, and the first and second near-critical angle anti-reflective layers comprise silicon dioxide.

5. The light transmission structure of claim 1, wherein the second near-critical angle anti-reflective layer comprises silicon dioxide when the light transmission structure is used for infrared imaging, and wherein the second near-critical angle anti-reflective layer comprises a layer of antibodies or a polymer when the light transmission structure is used for selectively detecting biomolecules or chemicals, respectively.

6. The light transmission structure of claim 1, wherein the substrate comprises at least one of optical borosilicate-crown glass and borosilicate thin glass of a prescribed thickness.

7. The light transmission structure of claim 1, further comprising a prism bonded to at least a portion of a bottom surface of the substrate and configured to couple the light source and detector to the light transmission structure.

8. The light transmission structure of claim 1, further comprising:
   a third near-critical angle anti-reflective layer disposed on at least a portion of the upper surface of the second near-critical angle anti-reflective layer;
   a fourth near-critical angle anti-reflective layer disposed on at least a portion of an upper surface of the third near-critical angle anti-reflective layer; and
   a biochemical surface functionalization layer formed on at least a portion of an upper surface of the fourth near-critical angle anti-reflective layer;
   wherein the second near-critical angle anti-reflective layer is formed having at least one of a thickness and a material type configured to provide a prescribed lateral displacement of transmitted or reflected light in the light transmission structure.

9. The light transmission structure of claim 8, further comprising a polarization layer disposed on at least a portion of the upper surface of the fourth near-critical angle anti-reflective layer, the polarization layer being configured such that transmitted light passing through the light transmission structure, upon hitting a boundary between the fourth near-critical angle anti-reflective layer and the polarization layer, is totally internally reflected, resulting in a polarization change in the transmitted light.

10. The light transmission structure of claim 1, further comprising a polarizing filter disposed between the detector and the light transmission structure, wherein the light source is configured to provide polarized transmitted light.

11. A light transmission structure for use, in conjunction with a light source and detector, for selective detection of at least one of biomolecule interactions and absorption of infrared light, the light transmission structure comprising:
   a substrate, the substrate having a bottom surface adapted to couple the light source and detector to the light transmission structure;
   an optical coupling and light enhancing layer disposed on at least a portion of an upper surface of the substrate;
   a first near-critical angle anti-reflective layer disposed on at least a portion of an upper surface of the optical coupling and light enhancing layer;
   a second near-critical angle anti-reflective layer disposed on at least a portion of an upper surface of the first near-critical angle anti-reflective layer;
   a third near-critical angle anti-reflective layer disposed on at least a portion of the upper surface of the second near-critical angle anti-reflective layer;
   a fourth near-critical angle anti-reflective layer disposed on at least a portion of an upper surface of the third near-critical angle anti-reflective layer;
   a polarization layer disposed on at least a portion of an upper surface of the fourth near-critical angle anti-reflective layer, the polarization layer being configured to provide total internal reflection of transmitted light in the light transmission structure; and
   a biochemical surface functionalization layer formed on at least a portion of an upper surface of the polarization layer;
   wherein the second near-critical angle anti-reflective layer is formed having at least one of a thickness and a material type configured to provide a prescribed lateral displacement of transmitted or reflected light in the light transmission structure, and wherein a difference in refractive index between adjacent near-critical angle anti-reflective layers is less than about 0.01.

* * * * *